United States Patent
Zhang et al.

(10) Patent No.: US 8,993,806 B2
(45) Date of Patent: Mar. 31, 2015

(54) ORGANIC POROUS MATERIALS COMPRISING SHAPE-PERSISTENT THREE-DIMENSIONAL MOLECULAR CAGE BUILDING BLOCKS

(75) Inventors: Wei Zhang, Superior, CO (US); Richard D. Noble, Boulder, CO (US); Yinghua Jin, Superior, CO (US); Bret A. Voss, Boulder, CO (US)

(73) Assignee: The Regents of the University of Colorado, a body Corporate, Denver, CO (US)

( * ) Notice: Subject to any disclaimer, the term of this patent is extended or adjusted under 35 U.S.C. 154(b) by 164 days.

(21) Appl. No.: 13/635,882

(22) PCT Filed: Mar. 18, 2011

(86) PCT No.: PCT/US2011/029103
§ 371 (c)(1),
(2), (4) Date: Oct. 3, 2012

(87) PCT Pub. No.: WO2011/116359
PCT Pub. Date: Sep. 22, 2011

(65) Prior Publication Data
US 2013/0047849 A1    Feb. 28, 2013

Related U.S. Application Data

(60) Provisional application No. 61/315,753, filed on Mar. 19, 2010.

(51) Int. Cl.
*C07C 211/00* (2006.01)
*B01D 53/02* (2006.01)
*B01J 20/26* (2006.01)
*B01J 20/28* (2006.01)
*B01J 20/32* (2006.01)
*B82Y 30/00* (2011.01)

(52) U.S. Cl.
CPC .............. *B01D 53/02* (2013.01); *B01J 20/267* (2013.01); *B01J 20/28007* (2013.01); *B01J 20/3212* (2013.01); *B01J 20/3236* (2013.01); *B01J 20/28045* (2013.01); *B82Y 30/00* (2013.01); *B01D 2253/20* (2013.01); *B01D 2253/202* (2013.01); *B01D 2257/504* (2013.01); *Y02C 10/08* (2013.01)
USPC ....................................................... 564/305

(58) Field of Classification Search
CPC ................................................... B01J 20/3236
USPC ............................................................ 95/130
See application file for complete search history.

(56) References Cited

PUBLICATIONS

Rowan et al., "Dynamic Covalent Chemistry" 2002, Angew Chem Int Ed 41:898-952.
Schwab et al., "Catalyst-free Preparation of Melamine-Based Microporous Polymer Networks through Schiff Base Chemistry" 2009, J Am Chem Soc 131:72169-7217.
Sozzani et al., "Methane and Carbon Dioxide Storage in a Porous van der Waals Crystal" 2005, Angew Chem Int Ed 44:10816-1820.

(Continued)

*Primary Examiner* — Clinton Brooks
(74) *Attorney, Agent, or Firm* — Saul Ewing LLP; Kathryn Doyle; Domingos J. Silva

(57) ABSTRACT

Porous bulk materials formed of shape-persistent, non-collapsible, three-dimensional molecular cage building blocks are presented that are useful for a variety of applications including gas separation/storage, sensing, and catalysis.

4 Claims, 11 Drawing Sheets

(56) References Cited

PUBLICATIONS

Thallapally et al., "Frustrated Organic Solids Display Unexpected Gas Sorption" 2006, J Am Chem Soc 128:15060-15061.
Tian et al., "Amorphous Molecular Organic Solids for Gas Adsorption" 2009, Angew Chem Int Ed 48:5492-5495.
Tozawa et al., "Porous Organic Cages" 2009, Nature Materials 973-978.
Moore and Zhang, "Shape-Persistant Macrocycles: Structures and Synthetic Approaches from Arylene and Ethynylene Building Blocks" 2006, Angew Chem Int Ed 45:4416-4439.
Doonan et al., "Exceptional Ammonia Uptake by a Covalent Organic Framework" 2010, Nature Chemistry 235-238.
Ben et al., "Targeted Synthesis of a Porous Aromatic Framework with High Stability and Exceptionally High Surface Area" 2009, Angew Chem Int Ed 48:9457-9460.
Cote et al., "Porous, Crystalline, Covalent Organic Frameworks" 2005, Science 310:1166-1170.
Written Opinion of the International Search Authority for PCT/US2011/029103, international filed Mar. 18, 2011.
Cooper, "Conjugated Microporous Polymers." 2009, Adv Mat 21:1291-1295.
Han, et al., "Covalent Organic Frameworks as Exceptional Hydrogen Storage Materials" 2008, J Am Chem Soc 130:11580-11581.
Lim, et al., "Cucurbit[6]uril: Organic Molecular Porous Material with Permanent Porosity, Exceptional Stability, and Acetylene Sorption Properties." 2008, Angew Chem Int Ed 47:3352-3355.
McKeown and Budd, "Polymers of intrinsic microporosity (PIMs): organic materials for membrane separations, heterogenous catalysis and hydrogen storage." 2006, Chem Soc Rev 35:675-683.
Mastalerz, "The Next Generation of Shape-Persistent Zeolite Analogues: Covalent Organic Frameworks." 2008 Angew Chem Int Ed 47:445-447.

US 8,993,806 B2

ORGANIC POROUS MATERIALS COMPRISING SHAPE-PERSISTENT THREE-DIMENSIONAL MOLECULAR CAGE BUILDING BLOCKS

RELATED APPLICATIONS

The present application claims priority to U.S. provisional application 61/315,753, which has a filing date of Mar. 19, 2010. The listing of which is hereby incorporated by reference. The contents of any patents, patent applications, and references cited throughout this specification are hereby incorporated by reference in their entireties.

TECHNICAL FIELD

The present invention relates to organic porous materials based upon three-dimensional, shape-persistent, prismatic molecular cage building blocks (MCBBs); processes for preparing the same; and their methods of use, such as methods for separating gaseous $CO_2$ from $N_2$.

BACKGROUND

Capturing and separating molecular components from flue gas offers benefits including cost-effective material recycling and energy conservation. Flue gas is an exhaust gas transported by way of pipe or channel from sources such as ovens, fireplaces or furnaces. Separation of flue gas molecular components, such as carbon dioxide gas ($CO_2$) from nitrogen gas ($N_2$), particularly at ambient temperature and pressure, is a crucial factor for capturing carbon. One approach for gas separation involves absorption that uses reactive chemical solvents. Gas absorption is a process in which incorporation of gases into liquid chemical solvents permits separation and recovery of a gas. However, use of chemical solvents for gas separation is expensive, in part, owing to solvent loss from evaporation and corrosion of equipment from the chemical solvent.

Another gas separation approach is adsorption, a process that entails adhesion of molecules (e.g., gas molecules, liquid molecules or solid molecules) to a surface. Desired characteristics of a good adsorbent material include molecule selectivity and reversible loading of molecules onto the adsorbent material. Silica gel and activated carbon are examples of porous materials used for adsorption-based gas separation.

Another example of a porous material used for adsorption-based gas separation is a metal-organic-framework (MOF). MOFs are porous crystalline compounds constructed of building blocks comprising metal ions coordinated to organic ligand molecules. Pore sizes of MOFs can be controlled by appropriate selection of the organic ligand molecules, and desired chemical functionalities can be introduced into the building blocks. However, MOFs also demonstrate limitations for practical use in gas separation. For example, MOFs are often sensitive to air. Moreover, MOFs may possess structural defects, such as incomplete coordination of metals that may prevent efficient gas uptake. The extremely poor solubility of MOFs also makes them impractical for use in membrane technology applications for efficient molecular separations.

Other candidate porous materials for gas separation via adsorption include covalent organic frameworks (COFs) that, in contrast to MOFs, do not contain metal coordination sites. COFs are extended organic structures created by covalently linking COF molecular building blocks. COF building blocks are molecules linked entirely by covalent bonds. Covalent linkage of COF building blocks results in a stable crystalline network structure with directional bonding between the COF building blocks. Advantageously, COFs are light weight, thermally stable, and chemically robust. However, COFs usually have poor solubility and the covalent bonding in rigid, crystalline COF structures limits their usefulness in applications requiring structural flexibility.

Previously, well-defined 3-D frameworks of MOFs and COFs have been achieved through metal-coordination or hydrogen-bonding driven self assembly of 1-D or 2-D building units. These techniques result in thermally unstable and/or chemically unstable and/or insoluble 3-D frameworks that are often difficult to synthesize and exhibit poor selectivity in separating gasses.

SUMMARY OF THE INVENTION

Presented herein are porous materials that advantageously provide effective gas separation, are easy to synthesize, have improved solubility and are thermally stable as well as being chemically robust. The porous bulk materials presented herein are well-defined, highly-ordered organic frameworks that can be constructed by covalently linking 3-D cage building blocks containing predefined molecular pores. Such a "cage-to-framework strategy" enables efficient encoding of both dimensional (pore size/distribution) and functional information (guest recognition, sensing, catalysis, etc.) within the individual cage molecule and thus into the framework material as well.

The organic-based cage molecules presented herein are based upon three-dimensional, shape-persistent, MCBBs. Also presented herein are processes for preparing the organic-based cage molecules and their methods of use such as methods for separating gaseous $CO_2$ from $N_2$. The bulk porous materials assembled from such cage molecules can be easily tuned by varying the size and/or functionality of the cage components. Thus, a variety of organic-cage-based porous materials with well-controlled pore size and surface functionality are herein disclosed.

Accordingly, in one aspect, provided herein is a molecular cage building block that includes at least two top/bottom molecules covalently bound to at least two side molecules to form a non-collapsible structure.

In an embodiment, the at least two top/bottom molecules comprise polyamine molecules. The polyamine molecules may preferably include triamine benzenes, tetraamine porphyrins, and hexaamine benzenes, for example. In a preferred embodiment, the triamine benzenes are 1,3,5-trihexyl-2,4,6-tris(4-aminophenyl)benzene.

In an embodiment, the at least two side molecules of the molecular cage building blocks are any ring system with at least two aldehydes.

In an embodiment, the molecular cage building blocks are used in capturing and/or storing carbon containing gas and/or gasses.

In another embodiment, the molecular cage building block having a non-collapsible structure includes at least one of a $sp^2$-hybridized atom and a sp-hybridized atom.

In yet another embodiment, the molecular cage building block having a non-collapsible structure includes a chemical group selected from the group consisting of a vinyl group, an alkyne group, an aryl group, and a phenyl group wherein the top/bottom molecules are polyamine molecules selected from the group consisting of triamine benzenes, tetraamine porphyrins, and hexaamine benzenes and the side molecules are selected from the group consisting of any ring system with at least two aldehydes.

In another embodiment the top/bottom molecules and said side molecules are present in a stoichiometric ratio selected from 2:3, 2:4, and 2:6.

In one aspect, a method of preparing a molecular cage building block combines at least two polyamine molecules with at least two dialdehyde molecules in a one-pot reaction to yield a molecular cage building block having a non-collapsible structure.

In another embodiment, the method of preparing a molecular cage building block comprises a hydride reduction reaction to reduce carbon-nitrogen double bonds in the molecular cage building block to carbon-nitrogen single bonds.

In another embodiment, the method of preparing a molecular cage building block comprises combining polyamine molecules and dialdehyde molecules in a stoichiometric ratio selected from 2:3, 2:4, and 2:6.

In another embodiment, the method of preparing a molecular cage building block comprises having at least one of a $sp^2$-hybridized atom and a sp-hybridized atom.

In another embodiment, the method of preparing a molecular cage building block comprises having at least one chemical group selected from a vinyl group, an alkyne group, an aryl group, and a phenyl group.

In another embodiment, the method of preparing a molecular cage building block comprises having at least two polyamine molecules that are selected from triamine benzenes, tetraamine porphyrins, and hexaamine benzenes. In a preferred embodiment, an example of a triamine used is 1,3,5-trihexyl-2,4,6-tris(4-aminophenyl)benzene.

In another embodiment, the method of preparing a molecular cage building block takes place in a one-pot reaction that proceeds for between about 18 to about 60 hours.

In one aspect, provided herein is a bulk material comprising a plurality of molecular cage building blocks. Each molecular cage building block is a non-collapsible structure. Furthermore, the plurality of molecular cage building blocks three-dimensionally assembles to form the bulk material.

In an embodiment, the bulk material of molecular cage building blocks comprise molecular cage building blocks comprising at least two top/bottom molecules that are covalently bound to at least two side molecules.

In another embodiment, the bulk material of molecular cage building blocks comprise molecular cage building blocks comprising at least two top/bottom molecules that are polyamine molecules. The polyamine molecules may be triamine benzenes such as 1,3,5-trihexyl-2,4,6-tris(4-aminophenyl)benzene, tetraamine porphyrins, and hexaamine benzenes.

In an embodiment, the bulk material of molecular cage building blocks comprise molecular cage building blocks comprising at least two side molecules that are dialdehydes.

In another embodiment, the bulk material of molecular cage building blocks comprise molecular cage building blocks comprising at least one of a $sp^2$-hybridized atom and a sp-hybridized atom.

In yet another embodiment, the bulk material of molecular cage building blocks includes molecular cage building blocks comprising a chemical group selected from a vinyl group, an alkyne group, an aryl group, and a phenyl group.

In another embodiment, the bulk material of molecular cage building blocks comprise molecular cage building blocks comprising at least two polyamine molecules covalently bound to at least two dialdehyde molecules.

In another embodiment, the bulk material of molecular cage building blocks comprise molecular cage building blocks comprising polyamine molecules and dialdehyde molecules that are present in a stoichiometric ratio selected from 2:3, 2:4, and 2:6.

In one aspect, a method for preparing a polymeric bulk material of molecular cage building blocks with non-collapsible molecular cage building blocks utilizes crosslinking the molecular cage building blocks to form the polymeric bulk material.

In one embodiment, the method for preparing a polymeric bulk material of molecular cage building blocks with non-collapsible molecular cage building blocks utilizes crosslinking the molecular cage building blocks with one another through linker molecules to form the polymeric bulk material.

In one aspect, a method for gas separation is exposing a bulk material of molecular cage building blocks to a mixture of gaseous molecules.

In an embodiment, the method for gas separation separates $CO_2$ from $N_2$.

In an embodiment, the bulk material has a gas selectivity ratio for $CO_2$ over $N_2$ of greater than 10:1 (v/v) under ambient conditions.

In an embodiment, the bulk material has a gas selectivity ratio for $CO_2$ over $N_2$ of greater than 50:1 (v/v) under ambient conditions.

In another embodiment, the bulk material has a gas selectivity ratio for $CO_2$ over $N_2$ of greater than 100:1 (v/v) under ambient conditions.

In yet another embodiment, the bulk material has a gas selectivity ratio for $CO_2$ over $N_2$ of greater than 150:1 (v/v) under ambient conditions.

In one aspect, a molecular cage building block comprises at least two tri-arm monomers covalently bound to at least two tri-arm monomers to form a non-collapsible structure.

In one embodiment, the molecular cage building block comprises tri-arm monomers comprising triarylalkyne groups.

In one embodiment, the molecular cage building block comprises at least two tri-arm monomers covalently bound to at least two tri-arm monomers to form a non-collapsible structure that is used in capturing carbon containing gas.

In one embodiment, the molecular cage building block comprises at least two tri-arm monomers covalently bound to at least two tri-arm monomers to form a non-collapsible structure that is used in storing carbon containing gas.

In one embodiment, the molecular cage building block comprises at least two tri-arm monomers covalently bound to at least two tri-arm monomers to form a non-collapsible structure that includes at least one of a $sp^2$-hybridized atom and a sp-hybridized atom.

In one aspect, a method for preparing a polymeric bulk material comprised of molecular cage building blocks, comprises preparing non-collapsible molecular cage building blocks comprising at least two tri-arm monomers covalently bound to at least two tri-arm monomers to form a non-collapsible structure and crosslinking the molecular cage building blocks to form the polymeric bulk material.

In one aspect, a method of preparing a molecular cage building block, comprises combining at least two tri-arm monomers with at least two tri-arm monomers in a one-pot reaction to yield a molecular cage building block having a non-collapsible structure.

DETAILED DESCRIPTION OF THE INVENTION

Figure 1:
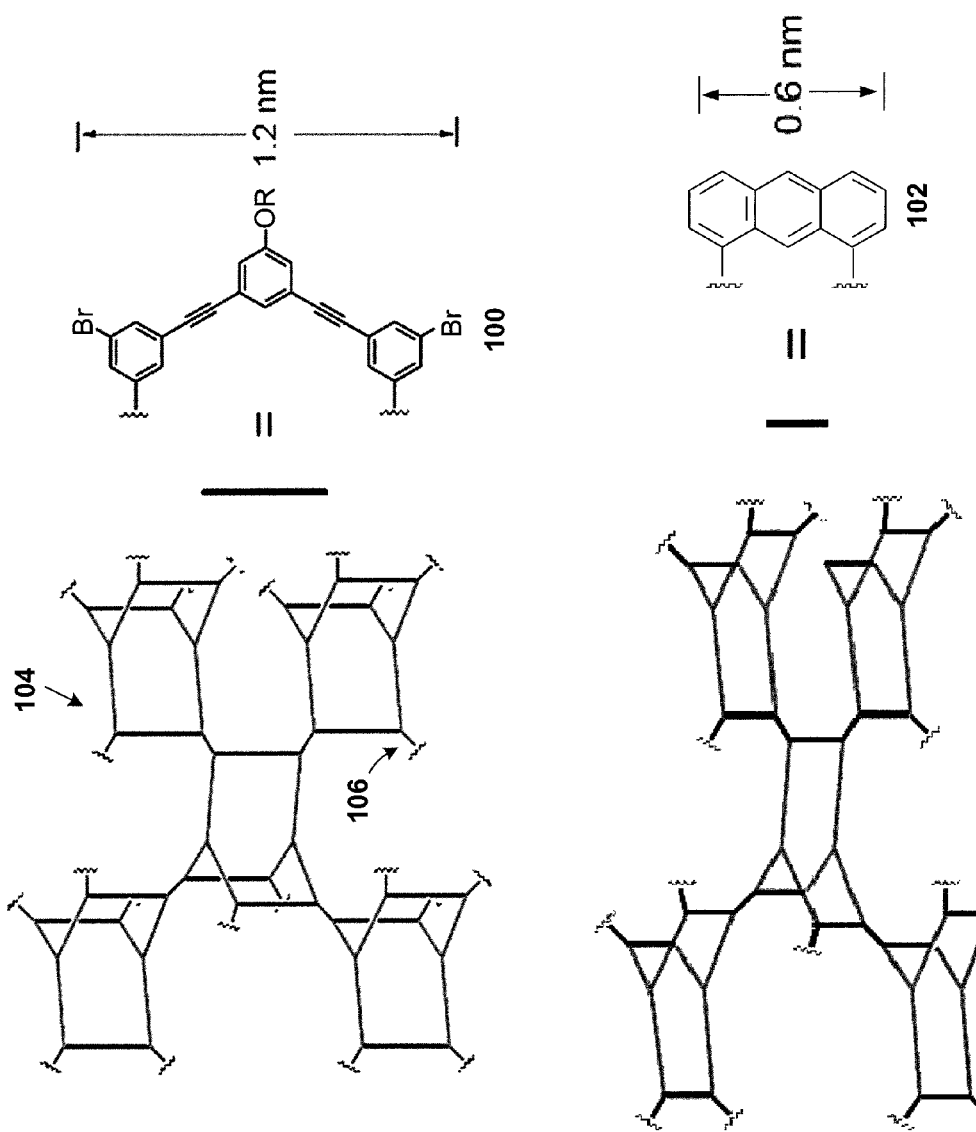
FIG. 1 illustrates molecular-level tunability of bulk materials.

Herein presented are a class of cage molecules, and bulk materials comprised of the cage molecules, for porous materials suitable for gas adsorption and separation, especially for $CO_2/N_2$ separation (carbon capture). The molecules and materials of the present disclosure have industrial applicability in many different industries including, but not limited to, power plants, treating flue gasses, automobiles, gas storage, gas separation, scrubbing technology, chemical sensing and catalysis.

The ability to produce highly-ordered, 3-D framework materials with precise control of their chemical and molecular structures allows for manipulation of the material composition to develop materials with unprecedented physical properties (e.g., mechanical, thermal, electrical, magnetic, etc.). The pore size and functional groups are two key parameters determining the chemical and physical properties of the resulting 3-D framework materials.

Advantages of the presently disclosed instrumentalities at least include: (1) efficient, modular construction of highly-ordered porous bulk materials; (2) molecular control over chemical and structural characteristics of bulk materials; (3) molecular level tailoring of cage size/geometry and framework functionality; (4) selectivity in molecular binding; (5) solubility of MCBBs in a variety of solvents; (6) one-pot synthesis of MCBBs; and (7) bulk material with low density, chemical stability, and thermal stability. These advantages show particular benefits in the context of gas storage and gas separation.

DEFINITIONS

The following definitions are provided to facilitate understanding of certain terms used herein and are not meant to limit the scope of the present disclosure:

The term "nanoparticle" refers to a particle with one or more dimensions of 1000 nm or less, or 500 nm or less, or 100 nm or less. Further, a nanoparticle behaves as a whole unit with regard to transport and properties. For example, a nanoparticle may have a diameter between 1000 nm and 1 nm, or between 800 nm and 10 nm, or between 500 nm and 100 nm. In one aspect, nanoparticles may comprise metallic, composite, ceramic, or polymeric materials. Non-limiting examples of ceramic nanoparticles include titanium oxide, zinc oxide, aluminum oxide, iron oxide, silicon carbide, titanium carbide, aluminum nitride, silicon nitride, silicon oxide, titanium nitride, and combinations thereof. Non-limiting examples of metallic nanoparticles include aluminum, gold, silver, palladium, platinum, cobalt, copper, iron, nickel, and combinations thereof.

The term "dynamic covalent chemistry" (DCC) refers to reversible chemical reactions performed under thermodynamic reaction control. Non-limiting examples of DCC include imine metathesis, olefin metathesis, alkyne metathesis and combinations thereof.

The term "molecular cage building block" (MCBB) refers to molecules solely comprising covalent bonds and having shape-persistent, rigid, non-collapsible, prismatic, three-dimensional structures. MCBBs may be used as building blocks for assembly of porous bulk materials.

The term "tri-arm monomer" refers to a triarylalkyne monomer. In one embodiment a tri-arm monomer is the tri-arm monomer substrate as depicted in Eq. 4. In one embodiment a tri-arm monomer may be a triarylalkyne comprised of three ring systems each being covalently linked at a first end to a central phenyl group and each having an alkyne group at a second end.

The term "side pieces" or interchangeably "side molecules" refers to constituent pieces of MCBBs that preferably comprise the "sides" of the MCBBs. Examples of molecules that can constitute one or more sides of an MCBB include, but are not limited to, any compound comprising an aromatic group (e.g., a phenyl) that is substituted by at least one aldehyde. For example, the side can be compound 200 or 202:

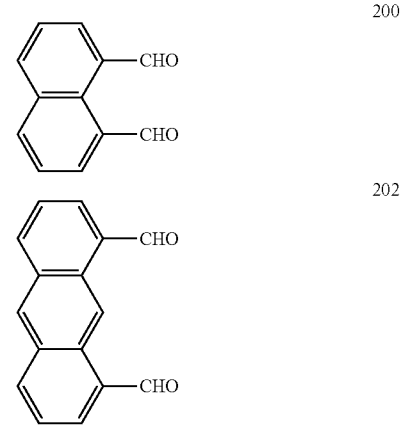

In another embodiment, the side molecule can be a compound of the formula I or formula II:

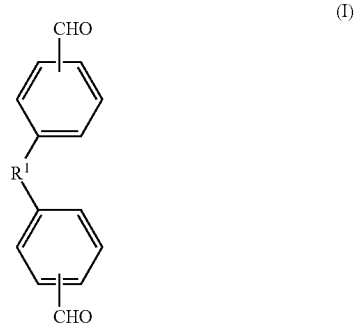

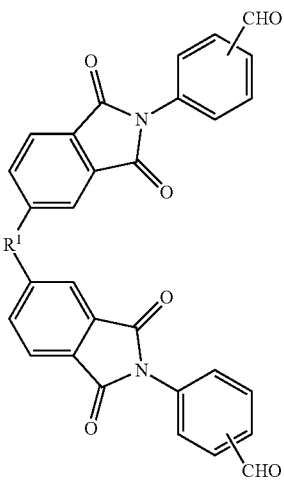

(II)

wherein each R¹ is, independently, one, two, three, four or five or more phenyl rings, wherein the phenyl rings are optionally substituted with a bromo group or other functional group that may be used to react with a linker molecule such as 1,4-diethynylbenzene, for example. Where R¹ is two or more phenyl rings, the phenyl rings may be connected by a $C_1$-$C_{10}$ alkyl group, a $C_2$-$C_{10}$ alkenyl group, or a $C_2$-$C_{10}$ alkynyl group. Non-limiting examples of compounds of the formula I or II include compounds 204 and 206 of FIG. 2, wherein R may be a bromo group or other functional group that may be used to react with a linker molecule such as 1,4-diethynylbenzene, for example. R may also be H or other non-reactive groups such as an alkyl group, and may also be any number of structural or functional groups, for example. In another embodiment a side molecule may be a tri-arm monomer.

The term "ring system" refers to any compound comprising at least one aromatic group (e.g., a phenyl) wherein the one or more aromatic groups are connected directly to one another and/or connected to one another by a $C_1$-$C_{10}$ alkyl group, a $C_2$-$C_{10}$ alkenyl group, or a $C_2$-$C_{10}$ alkynyl group. In a non-limiting example a ring system with two aldehydes is embodied by compound 200 wherein the ring system is naphthalene.

Figure 3:
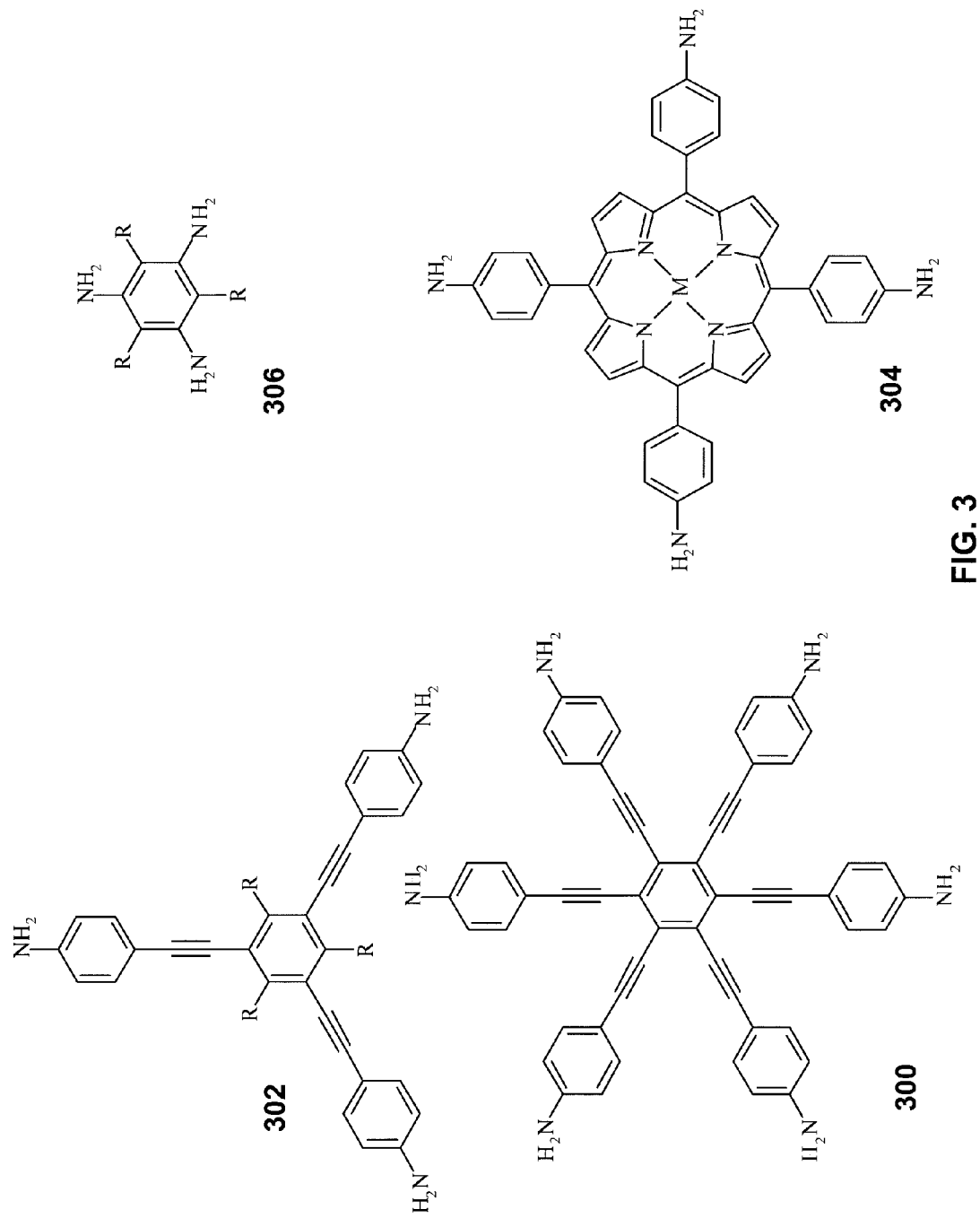
FIG. 3 illustrates exemplary polyamine molecules that may be used to create molecular cage building blocks, according to multiple embodiments.

The term "top/bottom pieces" or interchangeably "top/bottom molecules" or interchangeably "top/bottom panel" refers to constituent pieces of MCBBs that preferably comprise the "top" and "bottom" of a cage. The "top/bottom" pieces and/or molecules and/or panels may also be referred to herein individually as a top piece or top pieces or as a bottom piece or bottom pieces, for example. Examples of molecules that can constitute top/bottom pieces include an aromatic group, e.g., phenyl, that is substituted by at least three amino ($NH_2$) groups, phenyl-amino ($NH_2$) groups, or C≡C-phenyl-amino ($NH_2$) groups. Examples of such compounds include compounds 300, 302 and 306 as depicted in FIG. 3 wherein R is optionally one or more $C_1$-$C_{10}$ alkyl groups such as $C_6H_{13}$ for example, or may also be a $C_2$-$C_{10}$ alkenyl group, or a $C_2$-$C_{10}$ alkynyl group, for example. Top/bottom molecules also include porphyrin compounds (optionally chelated to a metal), that are substituted by one or more phenyl-amino ($NH_2$) groups. An example of such a compound is compound 304 as depicted in FIG. 3. In another embodiment a top/bottom molecule may be a tri-arm monomer.

The term "linker pieces" or interchangeably "linker molecules" refers to molecules that link individual MCBBs to at least one other MCBB. Non-limiting examples of linker molecules include divalent molecules such as 1,4-diethynylbenzene but may include other mono or polyvalent linker molecules.

The term "bulk material" refers to porous material formed by covalent or non-covalent assembly of MCBBs.

The term "prismatic" refers to a three-dimensional molecular structure having apexes formed by atoms or molecules. Exemplary prismatic structures include trigonal prisms, tetrahedrons, trigonal bipyramids, square prisms, square bipyramids, pentagonal pyramids, pentagonal bipyramids, dodecahedrons, as well as cubes and other three-dimensional structures having (i) parallel top/bottom pieces and/or side pieces of substantially equal size and shape and sides that are parallelograms or (ii) parallel top/bottom pieces and/or side pieces of differing sizes with similar shape and sides that are trapezoidal. It will be understood that due to molecular and/or electrostatic interactions deviations from ideal prismatic structures may occur. MCBBs described herein may have either ideal or non-ideal prismatic structures, and additional atoms or molecules may be located along the edges or faces of the prismatic structures.

The term "non-collapsible" refers to rigid molecular structures containing $sp^2$-hybridized atoms and/or sp-hybridized atoms. Non-limiting examples of non-collapsible chemical groups include vinyl groups, alkyne groups, aryl groups, and phenyl groups.

The term "dialdehyde" includes a molecule with at least two aldehyde functionalities. For example, a dialdehyde may be any ring system having two aldehyde functionalities. Non-limiting examples of dialdehydes include side pieces as depicted, for example, in FIG. 2.

A "polyamine" molecule includes at least two amine functionalities. For example, a triamine includes three amine functionalities, a tetraamine includes four amine functionalities, and a hexaamine includes six amine functionalities. A non-limiting example of a triamine is 1,3,5-trihexyl-2,4,6-tris (4-aminophenyl)benzene. Non-limiting examples of polyamines include top/bottom pieces such as benzyl triamines, phenyl triamines, porphyrin tetramines and phenyl hexamines as depicted, for example, in FIG. 3.

For purpose of this disclosure, the term "ambient condition(s)" refers to an environment having air pressure of about 0.9-1.1 bar, or more preferably about 1 bar, and having a temperature of about 290K to 300K, more preferably, 293K-298K, or even more preferably about 293K.

MCBBs

In contrast to the generally low solubility of MOFs and COFs, organic-based cage molecules presented herein are highly soluble in a variety of solvents such as $CHCl_3$, $CH_2Cl_2$, THF, and ethyl acetate, for example. This high solubility allows for fabrication of membranes or hybrid composite materials that may be used, among other things, for gas separation.

The cage molecules presented herein may be engineered to be many different geometric shapes and architectures. The cage molecules possess pores or internal voids which may vary in size and geometry according to the geometry of the cage molecules. The bulk porous materials assembled from such cage molecules can be easily tuned by varying the size and/or functionality of the cage components. The cage molecules provided herein may be constructed of different types of pieces. For example, pieces that preferably comprise the "top" and "bottom" of a cage may herein be referred to as "top/bottom molecules". An example of a top/bottom molecule is 1,3,5-trihexyl-2,4,6-tris(4-aminophenyl)benzene. Other molecules that may be used as pieces of a given cage, for example, would form the sides of the cages and herein may be referred to as "side molecules". An example of a side molecule is a dialdehyde with m-phenyleneethynylene moieties. In one example at least one side molecule may be covalently linked to at least one top/bottom molecule through the formation of at least one imine bond between at least one amine functional group on a top/bottom molecule and at least one aldehyde functional group on a side molecule. For example, a cage molecule may be formed wherein the at least two top/bottom molecules are bound to at least two side molecules to form a non-collapsible structure. The individual cage molecules may be linked by "linker molecules". The linker molecules may react with at least one cage molecule and thereby link the cage molecules to one another in a framework. One example of a linker molecule is a divalent linker molecule such as 1,4-diethynylbenzene.

Designing porous materials based on the dimensions of their constituent cage molecules and linking the cage molecules to one another to form a framework is referred to herein as a "bottom-up cage to framework strategy" or alternatively as a "bottom-up cage to framework approach". Such a bottom-up cage-to-framework strategy allows for a variety of organic-cage-based porous materials with well-controlled pore size, surface functionality and gas and/or molecular separating capabilities.

Described herein are organic porous materials based on shape-persistent, three-dimensional, prismatic MCBBs. MCBBs contain light elements connected by covalent bonds to provide material with chemical stability, thermal stability, and low density. Non-limiting examples of light elements include C, B, O, H, and N, and combinations thereof. In one embodiment, the MCBB contains thiol functional groups, bromo functional groups, and other elements connected by covalent bonds to tailor the chemical properties of the MCBB. In one embodiment, functional groups that bind nanoparticles are covalently bound to the MCBB. In one embodiment, the MCBB does not contain any metal. MCBBs are rigid and non-collapsible even in the absence of organic solvents. Moreover, MCBBs maintain substantially identical three-dimensional conformation in solution phase and in solid phase. MCBBs may be prepared by one-step techniques using solely organic-based building blocks via DCC.

MCBB preparation may proceed using a metathesis reaction involving a chemical reaction wherein an exchange of bonds occurs between two chemical reactants. In one embodiment, the metathesis reaction used for forming MCBBs is reversible. In another embodiment, the MCBB product distribution resulting from the metathesis reaction is under thermodynamic control. Non-limiting examples of metathesis reactions include alkyne metathesis reactions, olefin metathesis reactions, and imine metathesis reactions. In one example, a MCBB is prepared by imine metathesis by reacting a molecule containing three amine functional groups and a molecule containing two aldehyde functional groups in a single-step reaction.

In one embodiment, preparation of a porous bulk material may be performed by combining at least two molecules having a plurality of primary amine functional groups with at least two dialdehyde side molecules to form a MCBB. The at least two polyamine molecules may be the same as or different from one another, and the at least two dialdehyde side molecules may be the same as or different from one another. In one embodiment, the MCBB may be further stabilized by hydride reduction. Optional crosslinking of the MCBBs creates a three-dimensional, polymeric, cage framework, bulk material.

Assembly of MCBBs produces organic bulk material with defined porosity. In one aspect, MCBBs can be covalently assembled using covalent cross-linking reactions. Non-limiting examples of reactions used to covalently crosslink MCBBs include Sonogashira coupling, Suzuki coupling, Negishi coupling, Heck coupling, Glaser coupling, Castro-Stephens coupling, Stille coupling, Hiyama coupling, $S_N2$ substitution reactions, reductive amination, ester formation, amide formation, azide-alkyne Huisgen cycloaddition, and photochemical reactions. In one aspect, organic porous bulk material is prepared by covalent crosslinking of the molecular cage building blocks by coupling bromo (Br) functional groups of MCBBs using 1,4-diethynylbenzene.

As shown in FIG. 1, manipulation of MCBB structure permits the fabrication of bulk materials with molecular-level tunability. Molecular-level tunability of bulk material is achieved by manipulation of the size, geometry and/or functionality of MCBBs. FIG. 1 illustrates that MCBB assembly permits efficient, modular construction of ordered bulk structures with control over both their chemical and structural characteristics on a molecular level.

FIG. 1 provides various exemplary approaches for physical and chemical modifications of the bulk materials. The pore size of MCBBs may determine the pore size of the bulk material. For example, using MCBBs with differing dimensions produces bulk materials with differing pore sizes. In one example, a bulk material comprising a MCBB formed with a side component having a 1.2 nm length 100 produces larger physical pore sizes than a bulk material comprising a MCBB formed from a side component having a 0.6 nm length 102. In an embodiment, components of the MCBB that contribute to the dimensions are the top and bottom pieces 104. The individual MCBBs formed may be connected through linking molecules 106. In a non-limiting example, bulk material pore size is ≥10 Å, ≥5 Å, or ≥1 Å.

In one embodiment, chemically crosslinking MCBBs with functionalized liker molecules results in a polymeric bulk material. By selecting a functionalized linker molecule that has stronger binding interactions with $CO_2$ than with $N_2$, the gas adsorption selectivity of such framework structure can be further enhanced. High conversion of functional groups in the discrete cage molecule can be achieved by varying the ratio of cage molecule to linker and reaction conditions (i.e. solvents, temperature etc.). A rich diversity of linker molecules and individual cage molecules with different properties can thus lead to the development of functional framework materials with distinct properties targeting specific applications, such as enhanced gas separation, heterogeneous catalysis, chemical sensing, etc.

MCBB chemical composition and/or MCBB assembly may also affect the pore size of bulk material. For example, chemical crosslinking of MCBBs produces cross-linked, polymeric bulk material, the pore sizes of which may be affected by the chemical crosslinker (e.g., chemical crosslinker rigidity, chemical crosslinker size).

Assembly of MCBBs to form bulk material provides efficient preparation of porous materials with control over pore size and the chemical nature of the accessible surface area. This control improves gas separation efficacy. Furthermore, specific molecular recognition or catalytic sites may be introduced into porous materials by appropriate selection of chemical moieties in the MCBB. Molecular recognition or catalytic activity could be useful for chemical sensors (e.g., explosive and chemical warfare agent sensing) and heterogeneous catalysts.

Figure 2:
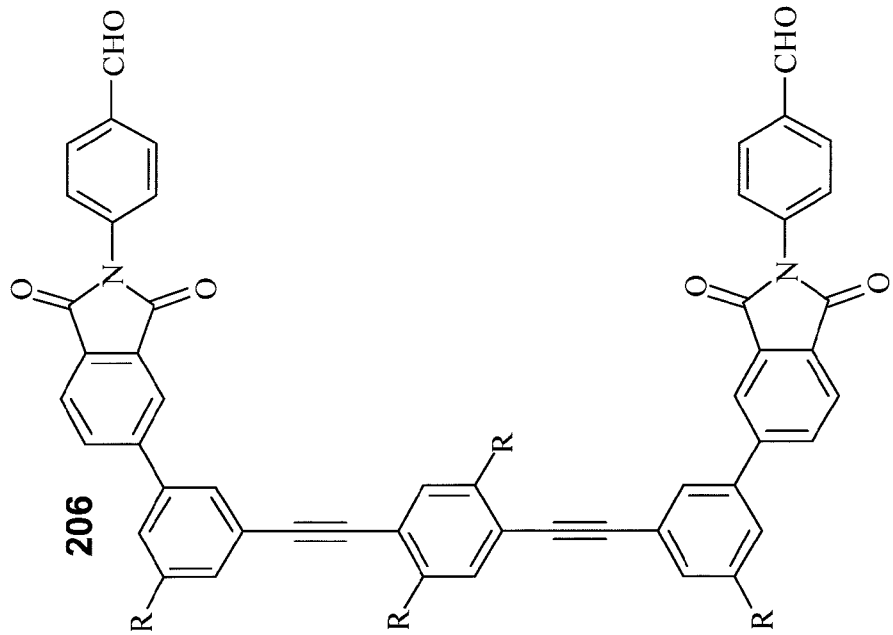
FIG. 2 illustrates exemplary dialdehyde molecules that may be used to create molecular cage building blocks, according to multiple embodiments.
Figure 2:
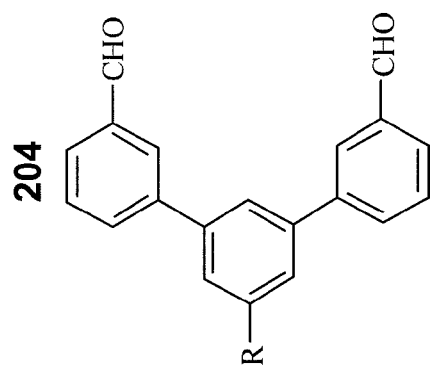
Figure 2:
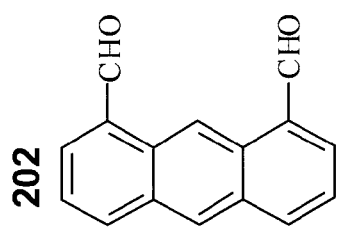
Figure 2:
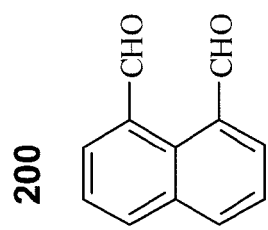

FIGS. 2 and 3 show that molecular structure manipulation of MCBBs offers a modular approach for controlling bulk material structure. As shown in FIGS. 2 and 3, the assembly of the side pieces 200, 202, 204, and 206; and top and bottom pieces 300, 302, 304, 306 of the MCBBs may produce a variety of prismatic or non-prismatic cages having various symmetries and pore sizes according to the various potential combinations of the side pieces, the top pieces and the bottom pieces. For example, combination of either of top/bottom pieces 302, having three reactive functional groups (amine, in these non-limiting examples) with any of the difunctional side pieces 200, 202, 204, and 206 shown (in this example, dialdehydes) would result in a trigonal prismatic MCBB. The pore size of the resulting MCBB is, in part, determined by the choice of side piece and in part by the choice of the top/bottom piece. Similarly, top/bottom piece 304 yields a tetragonal prismatic structure and top/bottom piece 300 yields a hexagonal prismatic structure.

In one embodiment, an imine-forming reaction between 1,3,5-trihexyl-2,4,6-tris(4-aminophenyl)benzene (302 wherein R is hexyl) as a top/bottom piece and a dialdehyde side piece produces a trigonal prism. Varying the size and functionality of the dialdehyde as well as the geometry of the top/bottom piece leads to molecular-level control of the pore size and functionality of the resulting MCBBs. In one embodiment, formation of MCBBs occurs using a one-pot synthesis, whereby a reactant, or reactants, undergoes multiple chemical reactions in a single vessel or container. In another embodiment, MCBB preparation proceeds using a metathesis reaction such as alkyne, olefin, or imine metathesis.

The syntheses of the prismatic cages are greatly facilitated by utilizing one-step, high yielding DCC instead of conventional multi-step, low-yielding covalent synthetic procedures. The reversible nature of DCC overcomes the formation of kinetically introduced, undesired bonds. Provided there is a large enough energy gap between the desired 3-D molecular structure and other possible oligomeric species, the target compound will be generated as the major product at equilibrium. Covalent assemblies of the prismatic cages presented herein were monitored by $^1$H NMR and/or gel permeation chromatography (GPC) analyses. Imine condensation reaction between the trigonal panels and lateral edges initially generated a series of intermediate oligomeric species as expected, which were confirmed by GPC characterization of the crude reaction mixtures. However, all the possible products were in equilibrium to one another and only prismatic compounds became predominant at equilibrium because molecular prisms are the thermodynamically most stable product and are enthalpy-favored because of no angle strain and also entropy-favored due to consisting of minimum number of building units.

Figure 1A:
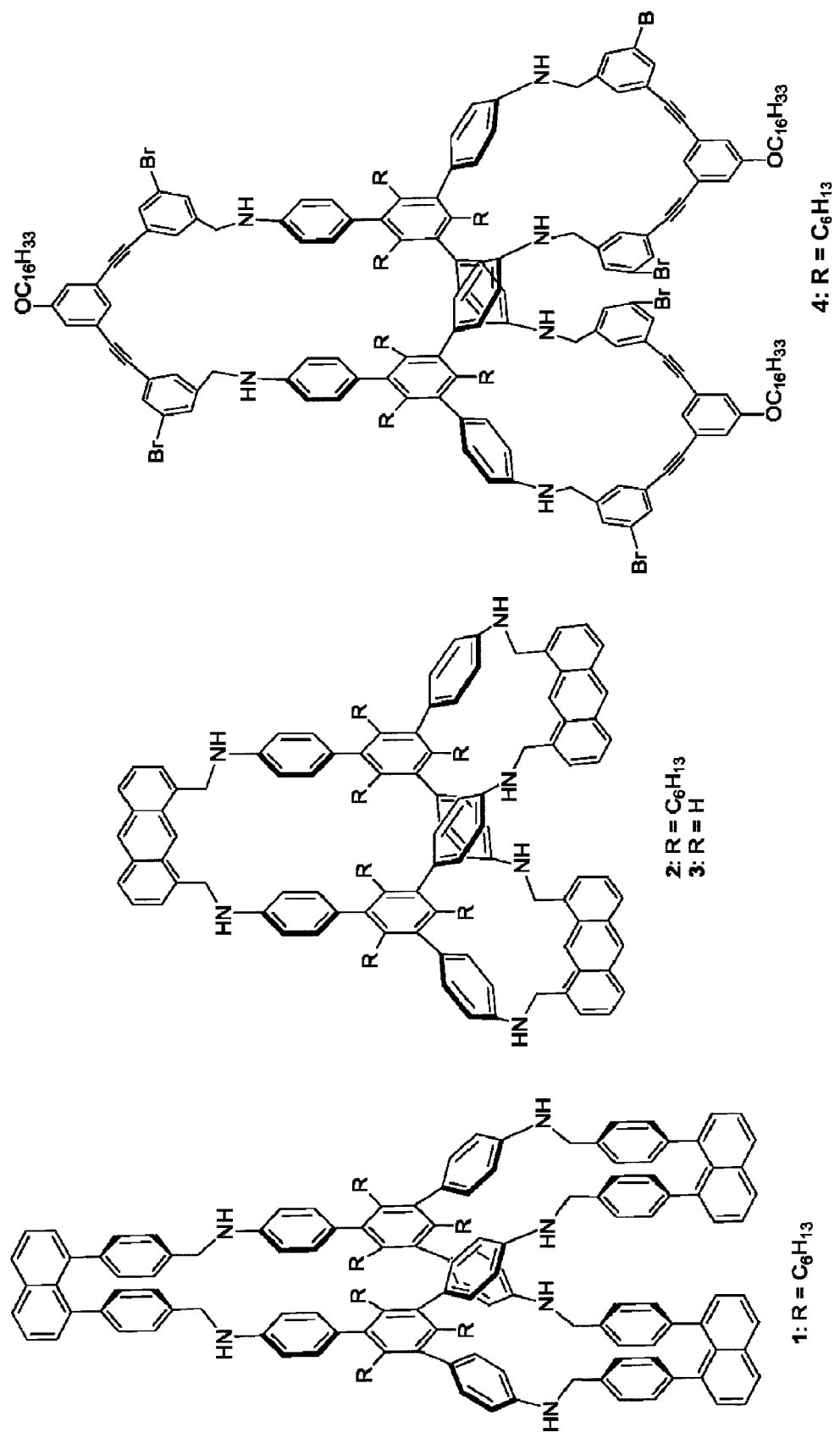
FIG. 1A illustrates cage molecules 1, 2, 3 and 4 synthesized via Scheme 1.

A series of organic cage molecules were synthesized in one pot from readily available starting materials and in high yield (46-90%) through an imine condensation reaction, see Scheme 1 below, and see FIG. 1A for more detailed structures of cages 1, 2, 3 and 4.

Scheme 1:

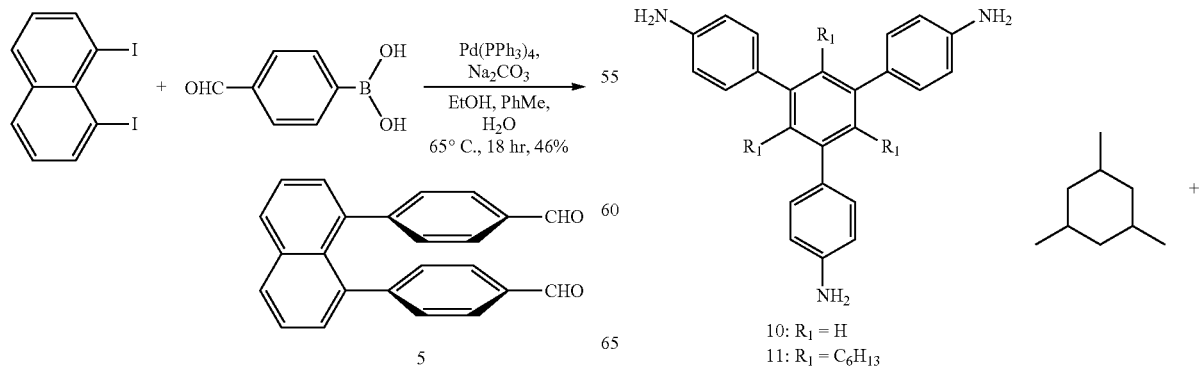

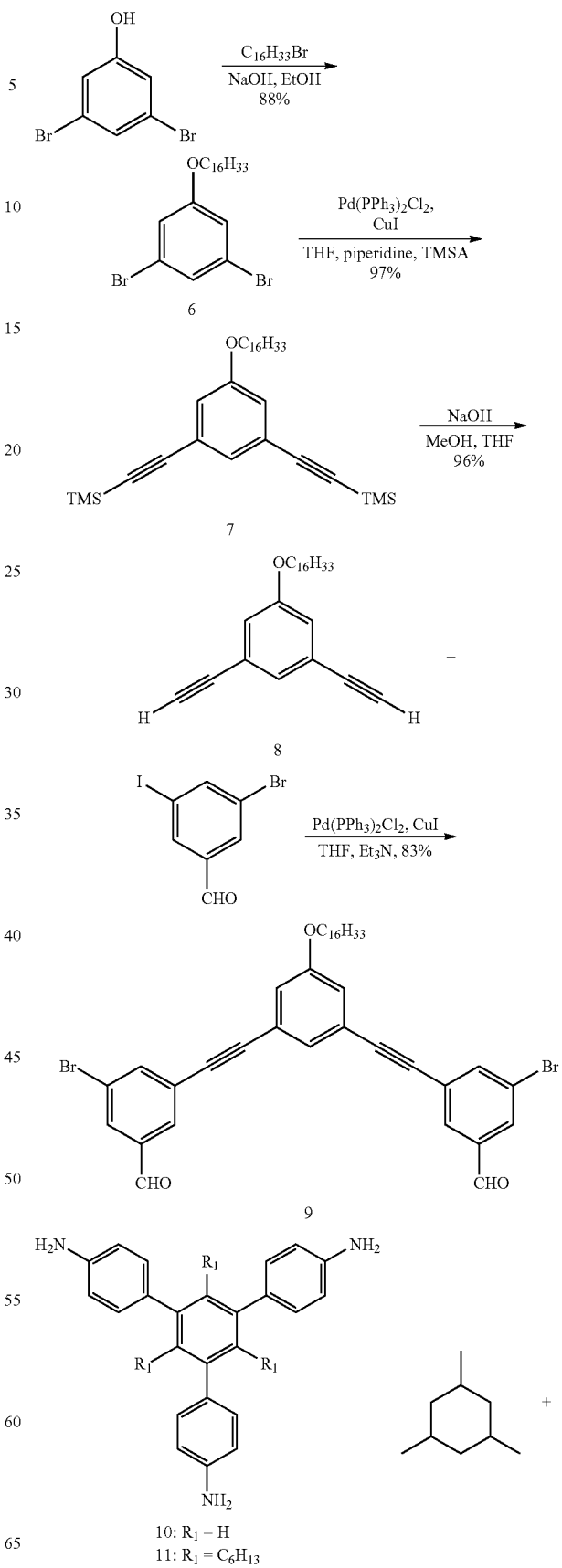

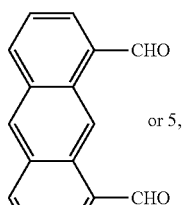

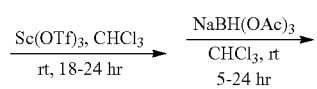

12

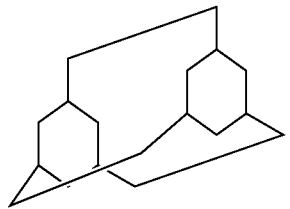

1 (90%)
2 (74%)
3 (75%)
4 (46%)

The cage compounds 1-4 were synthesized through a one-pot reversible imine condensation/metathesis reaction between triamines (10 or 11) and dialdehydes (5, 9, or 12), followed by hydride reduction of imine bonds to amines. Triamine moieties serve as top and bottom panels, top/bottom pieces, of the trigonal prism and dialdehyde moieties serve as the three lateral edges, side pieces. Cage 1 consisting of 1,8-bis(4-formylphenyl)naphthalene (5) side pieces contains the smallest pore, while cage 4 containing m-phenyleneethynylene moieties has a larger intrinsic pore volume. Cage 3, without any side chains, was designed to study the effect of side chains on the gas adsorption behavior (through comparison with cage 2). 1,8-Bis(4-formylphenyl)naphthalene (5) was prepared from 1,8-diiodonaphthalene through Suzuki coupling. The dialdehyde 9 was synthesized from 3,5-dibromophenol via alkylation, Sonogashira coupling, and desilylation, followed by the final Sonogashira coupling between the diethynyl-substituted intermediate 8 and 3-bromo-5-iodobenzaldehyde. Imine condensation reactions between triamines and dialdehydes were conducted in chloroform under the catalysis of $Sc(OTf)_3$ at room temperature to form imine linked cage assemblies. $^1H$ NMR spectra and GPC analyses of the crude products indicated the high conversion (>90%) of the starting materials to the desired cage compounds. One-pot reduction of imine-linked cages that were generated in situ yielded compounds 1-4 in moderate to excellent yields (46-90%). The cage molecules (1, 2, and 4) are highly soluble in a variety of commonly used organic solvents (e.g. $CHCl_3$, $CH_2Cl_2$, THF, ethyl acetate). Cage 3 without any alkyl chains has slightly lower solubility in the above mentioned solvents.

Additionally, in order to further investigate the effect of the intrinsic porosity of the molecular cage structure on gas adsorption properties, a non-cage substrate 13 was synthesized through reacting top panel 11 with 3 equivalents of 1-naphthaldehyde under the imine condensation condition followed by the one-pot hydride reduction (Eq. 1).

(Eq. 1)

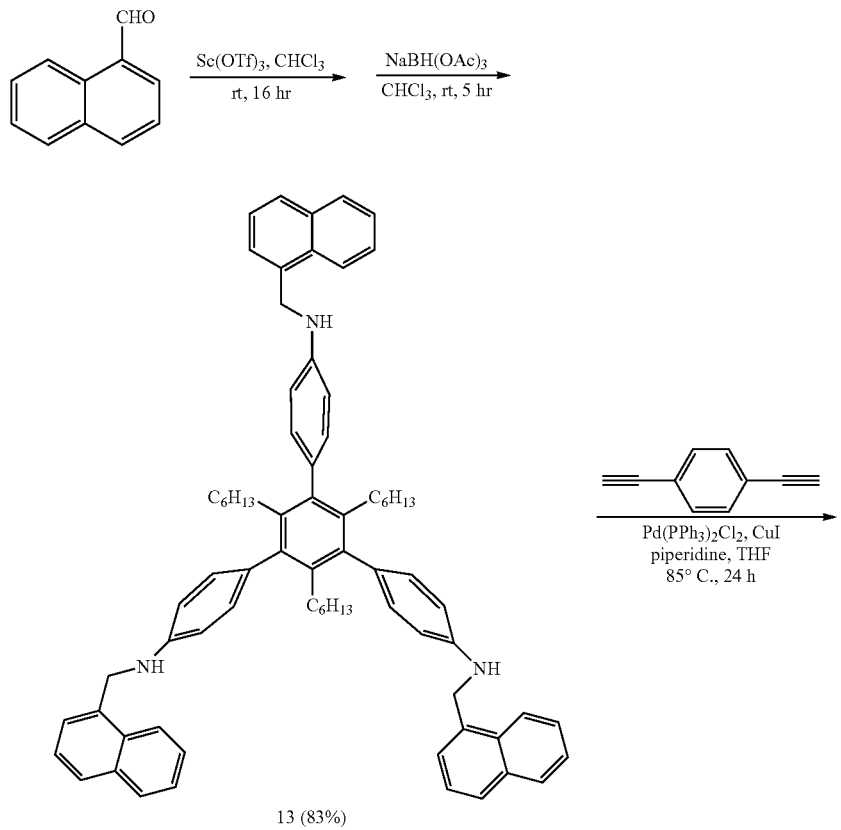

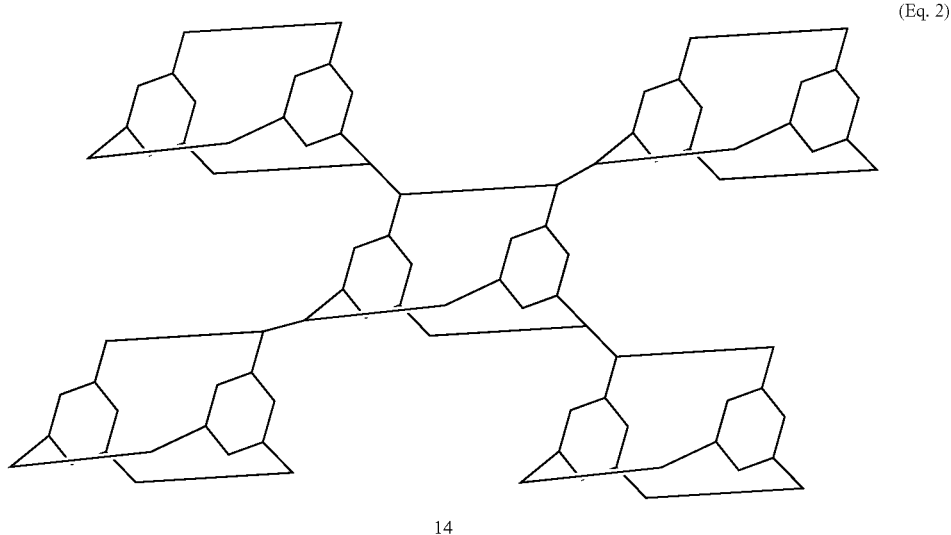

(Eq. 2)

14

Sonogashira coupling between cage 4 and 1,4-diethynylbenzene (Eq. 2) led to a red-brown gel-like substance that was thoroughly washed with organic solvents, vacuum-dried, and crushed into powder. The $^{13}$C cross-polarization magic angle spinning (CP-MAS) NMR spectrum of framework 14 shows resonances at 156 and 89 ppm, which can be assigned to the bromosubstituted aromatic carbons and the acetylene carbons, respectively. The integration ratio of 1:6 of these two types of carbon atoms indicates about 50% conversion of the bromo functional groups initially present in cage 4. Covalently-connected, cage-based framework structure 14, insoluble in common organic solvents, was compared to non-crosslinked discrete cage molecule 4 in terms of thermal stability, gas adsorption selectivity and gas uptake capacity.

Cage molecules 1-4 and cage framework 14 were also characterized by X-ray powder diffraction. Cage 2 and framework 14 exhibit some crystalline features, while the others are amorphous with only minor crystallinity.

Characterized by thermogravimetric analysis (TGA), cage compounds (1-3) showed exceptionally high thermal stability ($T_{dec}$>690 K) compared to many other organic molecular porous materials and MOFs. Cage 4 shows the lowest thermal stability, with a decomposition temperature around 640 K. The cross-linked cage framework 14 showed a substantial weight loss (24%) between 474 K and its decomposition temperature 694 K.

Figure 9:
FIG. 9 illustrates scanning electron microscope (SEM) images (scale bar=10 μm): a) cage 1; b) cage 2; c) cage 3; d) cage 4; e) cage 2'; f) cage framework 14.

The morphologies of the porous materials based on cages 1-4, 14, and imine-linked cage 2' were characterized using a scanning electron microscope as illustrated in FIG. 9. Cage 2 and 2' vary from one another in that cage 2 has amine linkages and cage 2' has imine linkages. Samples of cage 1 and 4 exhibit a sheet-like morphology with little evidence of mesopores or macropores on the surfaces, while cage 2 shows a large number of isolated pores on its surface. Samples of cage 3 and 2' are composed of porous agglomerates consisting of several micron-sized particles, and the morphology of cross-linked cage framework 14 is almost featureless.

In an embodiment of the present disclosure, the prismatic cage structures herein are constructed with high efficiency in a modular fashion through DCC, this method allows systematic tuning of their pore size and functionality. Varying the size and geometry of the top-bottom building blocks and/or side pieces (e.g. 5, 9, or 12) leads to the formation of a series of nanoporous materials with different pore volumes. The flexible functional group choice (amine vs aldehyde) of imine bonding partners further facilitates the synthetic accessibility of building blocks. For example, top and bottom panels of the cage could be substituted with aldehydes (16) instead of amines and the three lateral edges could contain complimentary amino groups (15). Imine condensation between 15 and 16 results in molecular cage 17 with a yield of (45%, Eq. 3), comparable to the synthesis of 4. Thus, the imine condensation approach in molecular cage synthesis is versatile.

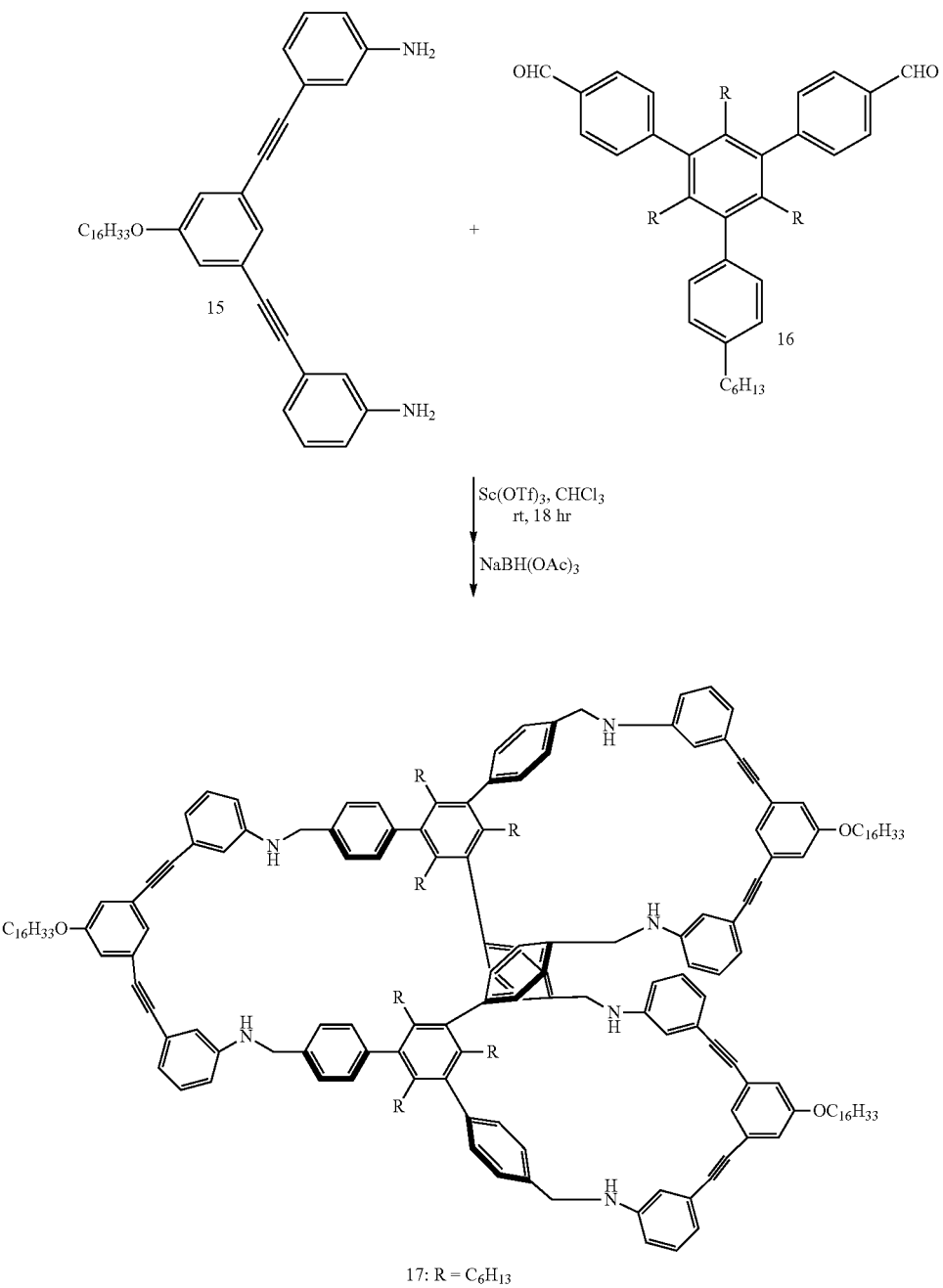

Figure 10:
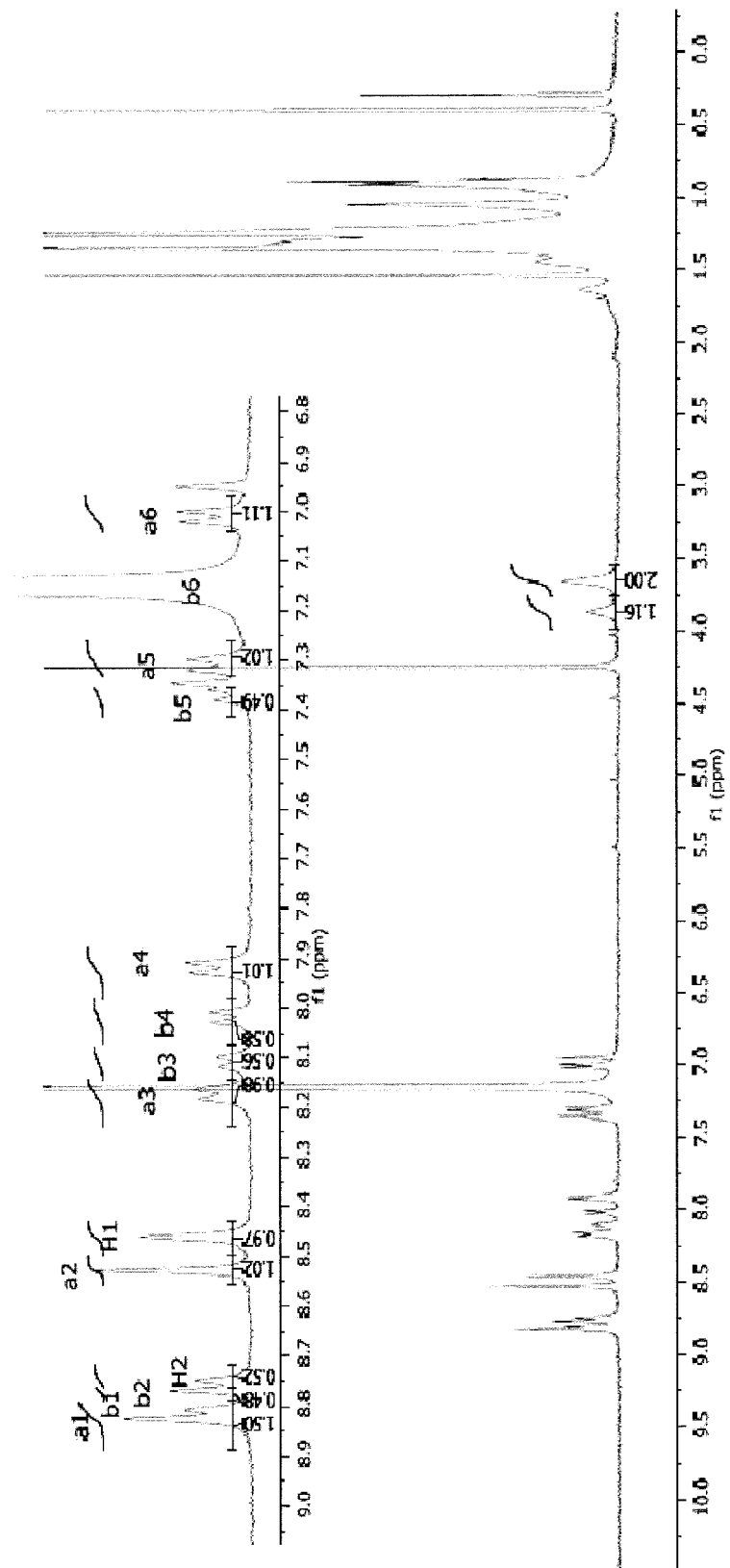
FIG. 10 illustrates the one dimensional $^1$H NMR spectrum of cage I.

In another embodiment of the present disclosure, the prismatic cage structures herein are constructed with high efficiency in a modular fashion through DCC using alkyne metathesis. In one embodiment a tri-arm monomer substrate alkyne is used as both a top/bottom piece and as a side piece to form an acetylene-linked MCBB through alkyne metathesis. In one embodiment the tri-arm monomer is a triarylalkyne. In an embodiment, synthesis of an acetylene-linked molecular cage through alkyne metathesis occured in one step according to Eq. 4 in a yield of 90% to give Cage I. Cage I was synthesized by premixing ligand $L_2$ (4.5 mg, 0.0096 mmol) and the trisamidomolybdenum(VI) propylidyne precursor (6.0 mg, 0.0093 mmol) in dry carbon tetrachloride (3 mL) for 20 minutes to generate the catalyst in situ. Subsequently, the tri-arm monomer substrate, (0.107 mmol) was added, and the resulting mixture was stirred for 16 h at 40° C. The reaction mixture was then filtered to remove the byproduct diarylalkyne and the filtrate was concentrated and subjected to column chromatography over silica gel. The tetrameric cage I compound was obtained in 90% yield. Cage I was then characterized by $^1$H, $^{13}$C NMR, MALDI-MS, and gel permeation chromatography (GPC). The one dimensional $^1$H NMR spectrum of cage I is illustrated in FIG. 10. In one embodiment, cage I may contain functional groups that react with linker molecules. In one embodiment linker molecules may link the acetylene-linked MCBBs together to form a bulk material.

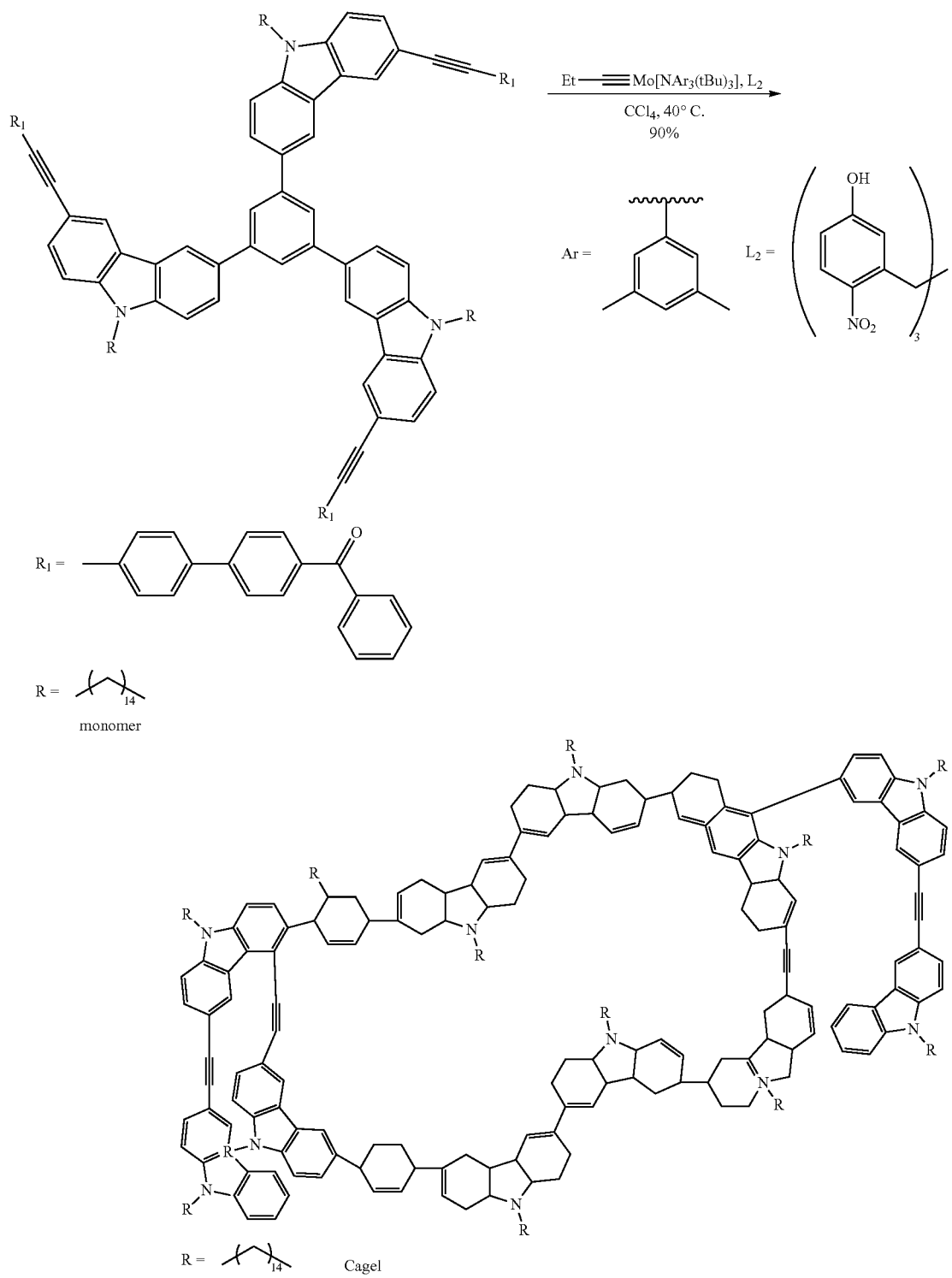

(Eq. 4)

Gas Adsorption

To achieve high $CO_2/N_2$ adsorption selectivity by using organic-cage-based porous materials, an optimal balance of cage/pore size, chemical functionalities and/or amino molar density is desired. In one aspect, the presence of chemical functionalities on the MCBB influences MCBB assembly and pore size of the bulk material. The intrinsic porosity of the molecular cage structure is another element in achieving high selectivity in gas adsorption. Another element in achieving high selectivity in gas adsorption is by using MCBBs with different chemical moieties to produce bulk materials with differing chemical properties.

In one embodiment, chemical reactions between gas molecules and reactive functional groups of the MCBBs may permit enhanced gas adsorption selectivity. In one embodiment, $CO_2$ adsorption selectivity results from a strong chemical interaction between the $CO_2$ gas and secondary amine groups in the pores of the MCBB through the formation of a carbamate. In another embodiment, reactive functional groups may be bound to the linker molecules of MCBBs that comprise a porous bulk material. In yet another embodiment, reactive functional groups may be bound to any top/bottom part and/or any side part of the MCBB as well as to the linker molecules of MCBBs that comprise a porous bulk material in addition.

Certain MCBB materials exhibit high selectivity in adsorption of $CO_2$ over $N_2$. In one embodiment, a MCBB material shows at least two orders of magnitude of selectivity, ≥100:1, v/v, for adsorption of $CO_2$ over $N_2$ under ambient conditions (1 bar, 293K). A $CO_2/N_2$ adsorption selectivity of 100 at ambient conditions is superior to many MOF materials that report $CO_2/N_2$ adsorption selectivity below 10. Other non-limiting examples include MCBBs with selectivity at ≥1000:1, v/v; ≥75:1, v/v; ≥50:1, v/v; ≥25:1, v/v; or ≥10:1, v/v for adsorption of $CO_2$ over $N_2$ at ambient conditions (1 bar, 293K). The selectivity, particularly the $CO_2/N_2$ adsorption selectivity, and reversible loading of gases demonstrated by MCBBs, is a desired characteristic for a gas adsorbent.

In one example, molecular cage building blocks with chemical functionalities enabling $O_2$ binding may provide a porous material with the capacity for $O_2/N_2$ separation. For example, MCBBs may demonstrate gas selectivity for $O_2$ and $N_2$ of greater than 10:1 (v/v), greater than 50:1 (v/v), greater than 100:1 (v/v) or about 150:1 (v/v) or greater under ambient conditions.

In another example, the selectivity of the bulk materials for a particular gas may also be the basis for the bulk materials to be used for gas storage. The adsorbed gas could remain stored within the MCBB bulk material until it is retrieved or released through the application of a vacuum to the bulk material or through other means.

The correlation between pore size and gas adsorption properties is exemplified through measuring gas adsorption properties of a series of trigonal prisms that were synthesized via scheme 1 and that have internal cavities of different sizes. The selectivity in $CO_2/N_2$ adsorption was measured at 20° C. by using an instrument for low-pressure gas adsorption. The cage molecules in Table 1 demonstrated ideal selectivity for $CO_2/N_2$ adsorption varying from about 36/1 to about 138/1, see Table 1. Cage 4 demonstrated the highest selectivity at 138/1 of $CO_2$ over $N_2$.

TABLE 1

| Compound | $CO_2$ adsorption (1 bar, 20° C.) | | $N_2$ adsorption (1 bar, 20° C.) | | Pore size (A) | Ideal selectivity $CO_2/N_2$ |
|---|---|---|---|---|---|---|
| | Wt % | cc/g | mol/mol | cc/g | mol/mol | |
| 1 | 0.61 | 3.32 | 0.31 | 0.033 | 0.0031 | 6.03 | 100 |
| 2 | 0.80 | 4.35 | 0.36 | 0.065 | 0.0053 | 6.27 | 67 |
| 3 | 1.02 | 5.58 | 0.33 | 0.157 | 0.0092 | 6.72 | 36 |
| 4 | 0.42 | 2.27 | 0.33 | 0.016 | 0.0024 | 5.27 | 138 |
| 2' | 0.84 | 4.56 | 0.37 | 0.117 | 0.0094 | 7.32 | 39 |
| 13 | 0.72 | 3.95 | 0.18 | 0.104 | 0.0048 | — | 38 |
| 14 | 1.57 | 8.01 | 1.22 | 0.127 | 0.0194 | — | 63 |

The gas adsorption selectivity depends on the amino group density of the cage molecule as well as the cage cavity size. The amino group density largely determines the $CO_2$ uptake, while $N_2$ adsorption capacity directly correlates to the cavity size of molecular cages. Cage 4 exhibits the lowest nitrogen uptake, due to its relatively smaller pore volume, while it shows comparable adsorption capacity for $CO_2$, thus showing the highest $CO_2/N_2$ adsorption selectivity (138/1). Relatively low adsorption selectivity (63/1) of 14 for $CO_2$ over $N_2$ compared to that of the discrete cage 4 (138/1) is partially due to the introduction of phenyleneethynylene linker moieties that lack the favored binding interaction with $CO_2$. Further functionalization of the phenyleneethynylene linkers with multiple amino groups or other $CO_2$ binding sites may further enhance the adsorption selectivity for $CO_2$ over $N_2$.

Generally, $CO_2$ uptake depends in part on the amino group density in the cage molecule and is generally less sensitive to the cage pore size. For example, cage 2', which is constructed through imine bonds, shows comparable $CO_2$ adsorption capacity to the further reduced amine analog 2. Cages (1-4, and 2') containing 6 nitrogen atoms in either amine or imine groups showed similar $CO_2$ uptake (~0.3 mol/mol) and the non-cage analog 13 which has only three amine groups adsorbs almost half as much $CO_2$ (0.18 mol/mol), compared to the corresponding cage analog 2. Much higher $CO_2$ loading capacity (1.22 mol/mol) was observed in cage framework 14 than that in the other discrete cage molecules, which is likely due to the higher exposure (more convenient access) of $CO_2$ to amine functional groups in the ordered framework structure 14. In terms of cc/g for the $CO_2$ adsorption, cage 4, with the largest molecular weight, exhibits the lowest uptake because the number of amino groups per gram of the material is much smaller (0.9 μmol/g, "amino group density") than other cages.

In contrast to the uptake of $CO_2$, the adsorption of nitrogen highly depends on the cage dimension. There is an increase in $N_2$ uptake with the increase of cage pore size. For example, cage 4 with the smallest pore size of 5.27 Å (defined as the distance between the two trigonal panels) adsorbs the least amount of $N_2$, while the largest cage 2' (pore size 7.32 Å) adsorbs significantly larger amount of $N_2$. The unsubstituted cage 3 also showed an enhanced nitrogen adsorption capacity compared to its parent cage molecule 2, presumably due to the removal of six hexyl chains, which increased the effective gas binding surface area of the resulting porous materials. Also observed was an almost 8-fold increase in the $N_2$ adsorption capacity of more ordered framework 14, compared to its parent cage 4. Therefore, crosslinking of the discrete cage molecules may significantly enhance gas adsorption capacity.

In another embodiment, gasses adsorbed by materials of the present disclosure may be extracted from the MCBBs or MCBB bulk materials through the application of a vacuum thus making the materials available for further gas separation.
Other Uses Bulk materials and cage compounds provided herein possess solubility in a variety of solvents and thereby offer great potential for fabrication of membranes or thin films for gas separation purposes. In one aspect, assembly of cage compounds disclosed herein produces porous bulk material that is used to cast a membrane. The membrane, comprising porous bulk material, is used to separate $CO_2$ from flue gas originating from a furnace. Other examples of flue gas source include, but are not limited to, ovens, fireplaces, boilers, and steam generators. In one embodiment, bulk material is cast into thin films and subsequently crosslinked using a photochemical crosslinking reaction. The bulk material may be cast upon multiple different surfaces or membranes, for example.

In another embodiment, inclusion of nanoparticles during assembly of bulk material results in polymer-metal nanoparticle composites. For example, a gold or silver atom may be incorporated within the pores of the cages of a bulk material. The nanoparticles may also be molecules, for example. In one embodiment, reactions occur between functional groups of the MCBBs and the nanoparticles. Non-limiting examples of nanoparticles include ceramic materials, polymeric materials, or metals such as gold (Au), silver (Ag), palladium (Pd), platinum (Pt), and combinations thereof. In one embodiment, thiol groups on MCBBs may react with gold nanoparticles. In another embodiment, carboxylate groups on the MCBBs may react with $TiO_2$ nanoparticles. In one embodiment, the nanoparticle has a diameter between 1000 nm and 10 nm.

In one embodiment, metal nanoparticles may be incorporated within the bulk material by introducing the metal nanoparticles after a crosslinking reaction to form the bulk material. In another embodiment, the metal nanoparticles are introduced into the cage molecules before the crosslinking reaction to form the bulk material. The resulting bulk materials containing metal nanoparticles may demonstrate improved mechanical, electrical, and magnetic properties compared to other materials obtained by mixing non-porous polymers with metal nanoparticles, for example.

In another embodiment, bulk material that contains nanoparticles within the MCBB is not chemically crosslinked In another embodiment, cage molecules may be linked with composite materials such as silicates or other ceramics. In one example, these composite materials contain an even distribution of organic and inorganic components without phase separation. These polymer-ceramic materials or polymer-silicate materials might display significant improvements in thermal and mechanical properties as compared to materials containing only organic cage building blocks.

In yet another embodiment of the present disclosure, MCBBs may be used for sensing applications. In one embodiment, bulk materials containing MCBBs having fluorophores bound within the pores of the cage molecules and/or bound to a top/bottom molecule and/or a side molecule may react with a given analyte that is indicative of a particular reagent existing in the environment in which the MCBBs or bulk material thereof are in contact with. Advantageously, the shape persistence of the MCBBs may prevent aggregation of fluorophores, and thus would potentially minimize excimer formation and avoid fluorescence quenching.

In another embodiment, MCBBs may be used for the fabrication of thin film solid-state sensors. These thin film solid-state sensors may be advantageous over prior sensors because the MCBB and porous bulk materials facilitate analyte vapor diffusion and adsorption to permit rapid responses and therefore may not suffer from the slow response of pre-existing sensors that have thicker films.

In one embodiment, a redox-active molecule may be used as a MCBB chemical moiety for sensing an explosive analyte. Non-limiting examples of redox-active molecules include 10-methyl-9,10-dihydroacridine and derivatives thereof. A sensor device capable of sensing an explosive analyte may be fabricated by depositing one or more organic porous bulk materials on a solid-state surface. Examples of solid-state surface materials include, but are not limited to, glass, silicon, and plastic. Exposure of the sensor surface to an explosive analyte would prophetically trigger chemical transformations (e.g., redox reactions) of the sensing moieties and would therefore cause a fluorescence optical output that could be measured by an optoelectrical component of the predictive explosive sensor device. In one embodiment, a solid state sensor may be utilized on a battlefield to rapidly and sensitively measure explosive fumes in the atmosphere by measuring fluorescence output of a variety of chemical sensing moieties.

In another embodiment of the present disclosure, controlling bulk material properties through manipulation of MCBB structure permits tailoring for applications such as chemical sensing, composite preparation, molecular storage, molecular separation, and catalysis.

In one embodiment, platinum, rhodium or palladium may be bound within a MCBB or may be part of a top/bottom piece and/or part of a side piece that comprise the MCBB. Such an MCBB and/or bulk material made there from may be selectively engineered to absorb particular types of gas, for example carbon monoxide. A bulk porous material made from such linked MCBBs could be applied to a catalytic converter and therefore may be used to convert harmful combustion gasses from automobile exhaust, such as carbon monoxide, into less harmful gasses, such as carbon dioxide, through the catalytic functions of the bound platinum, rhodium or palladium. In another embodiment of the application of these kinds of bulk materials within a catalytic converter, the carbon dioxide thus generated could then be selectively adsorbed by a different porous bulk material such as is described herein and would therefore prevent the carbon dioxide from polluting the atmosphere. The stored carbon dioxide could later be removed from the bulk material by means of applying a vacuum to the bulk material and transferring the stored carbon dioxide to a waste container, for example.

EXAMPLES

The following examples set forth MCBB materials and porous bulk materials and methods of forming the same. It is to be understood that these examples are provided by way of illustration and should not be unduly construed to limit the scope of what is disclosed herein.

Example 1

Preparation of Shape-Persistent, Organic, Prismatic Mcbbs

General experimental aspects, as well as procedures and characterization data thereof, are given below as embodied in the preparation and characterization of cage 1 and for 410 from FIG. 4.

To a solution of 1,3,5-trihexyl-2,4,6-tris(4-aminophenyl) benzene 11 (362 mg, 0.60 mmol) and 1,8-bis(4-formylphenyl)naphthalene (5) (304 mg, 0.90 mmol) in chloroform (200 mL) was added $Sc(OTf)_3$ (44 mg, 0.090 mmol) in CH3CN (10 mL) dropwise. The yellow solution was stirred at rt for 24 hr. $NaBH(OAc)_3$ (3.81 g, 18.0 mmol) was added, and the yellow suspension was stirred at rt for 5 hr. The mixture was quenched by the addition of saturated $NaHCO_3$ (50 mL), and the organic layer was separated. The aqueous layer was extracted with $CHCl_3$ (3×50 mL) The combined organics were dried over $Na_2SO_4$ and concentrated to give the crude product. Purification by flash column chromatography (20% EtOAc in hexane as eluent) yielded the molecular cage 1 (570 mg, 90%) as a light yellow solid: $^1H$ NMR (500 MHz, $CDCl_3$) δ 7.97 (d, J=8.2 Hz, 6H), 7.58 (t, J=7.6 Hz, 6H), 7.44 (d, J=7.0 Hz, 6H), 7.14 (d, J=8.1 Hz, 6H), 7.10-7.00 (m, 24H), 6.82 (d, J=8.2 Hz, 6H), 6.68 (dd, J=8.1, 2.1 Hz, 6H), 6.52 (dd, J=8.2, 2.1 Hz, 6H), 4.23 (s, 12H), 3.61 (s, 6H), 2.23-1.99 (m, 12H), 1.24-1.16 (m, 12H), 1.09-1.02 (m, 12H), 0.92-0.83 (m, 24H), 0.77 (t, J=7.3 Hz, 18H); $^{13}C$ NMR (101 MHz, $CDCl_3$) δ 146.70, 142.71, 140.34, 139.77, 139.23, 137.10, 135.67, 131.86, 131.60, 131.27, 130.71, 130.40, 129.63, 128.81, 126.69, 125.43, 112.74, 112.31, 49.25, 32.05, 31.24, 31.16, 29.81, 22.64, 14.48; MS (MALDI) calc'd for $C_{156}H_{162}N_6$ ([M+]) 2120.29. found 2120.52.

Figure 4:
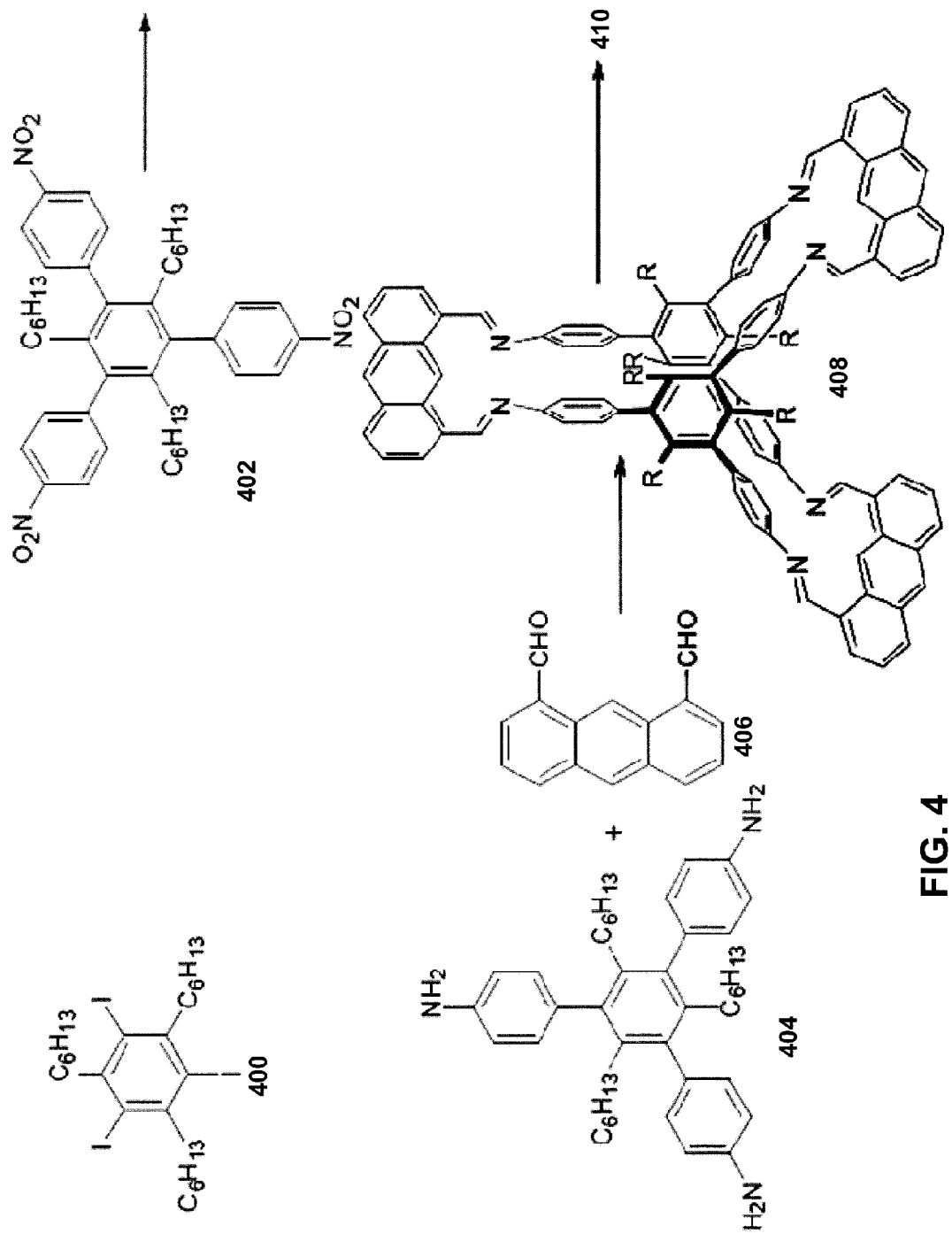
FIG. 4 schematically illustrates covalent assembly of a shape-persistent organic prismatic molecular cage building block.

As shown in FIG. 4, a triamine 404 starting material was synthesized from 1,3,5-trihexyl-2,4,6-triiodobenzene 400 via Suzuki coupling followed by reductive hydrogenation of 402. MCBB compound 408 was prepared in a one-pot synthesis from triamine 404 and dialdehyde 406 via dynamic covalent chemistry. Top and bottom panels of MCBB compound 408 include triamine 404 whereas the three side edges of MCBB compound 408 include dialdehyde 406. Triamine 404 contains three functional amine groups on each molecule and dialdehyde 406 contains two functional aldehyde groups on each molecule. Imine formation, or the formation of a carbon-nitrogen double bond between 404 and 406 was explored in various solvents including chloroform ($CHCl_3$), dichloromethane ($CH_2Cl_2$), 1,2,4-trichlorobenzene, and 1,2-dichloroethane and at different temperatures ranging from room temperature to 80° C. The highest yield was obtained by stirring the solution of 404 and 406 in a 2:3 stoichiometric ratio in chloroform for 18 hours at room temperature under the catalysis of scandium(III) triflate. Throughout the reaction, the mixture remained a clear, homogeneous solution and no precipitates or cloudiness were observed, which indicates solubility of the cage product and lack of formation of an insoluble polymer network. Because of the dynamic nature of imine metathesis, the condensation reaction between two equivalents of triamine 404 and three equivalents of dialdehyde 406 is under thermodynamic control. Therefore the desired three-dimensional molecular prism 408, which, among all the possible products, is enthalpy-favored due to no angle strain and also entropy-favored due to the limited number of building units, is generated as the major product at equilibrium. MCBB compound 408 was further converted into MCBB compound 410 by hydride reduction of carbon-nitrogen double bonds in 408 to carbon-nitrogen single bonds using $NaBH(OAc)_3$. MCBB compound 410 contains robust and stable C—N single bonds. Compound 410 was obtained in 65% isolated yield after column chromatography and was fully characterized by $^1H$ and $^{13}C$ nuclear magnetic resonance spectroscopy, gas phase chromatography, and matrix assisted laser desorption/ionization mass spectrometry.

The overall geometry of the proposed MCBB structure was established by single crystal X-ray spectroscopy analysis. Single crystals were obtained from a solution of 410 in a 1:4 mixture of ethyl acetate and hexane. X-ray diffraction analysis showed that 410 displays the expected trigonal prismatic structure with six amine bonds and a large central cavity. The two trigonal panels of 410 twisted about 22° with respect to each other; thus, the phenyl arms are not eclipsed but rotated toward a staggered geometry to minimize steric interactions. X-ray diffraction analysis showed that the molecular prisms of compound 410 stack on top of each other along the [100] direction in the offset fashion, and the layers do not interpenetrate. Moreover, internal voids of compound 410 interconnect with each other to form pore channels. X-ray diffraction analysis showed that the overall dimensions of compound 410 are about 5.6 Å in the distance between the top and the bottom panels, as viewed down the $C_2$ axis. The overall dimensions of compound 410 are about 2.4 nm in diameter at the widest point, as viewed down the $C_3$ axis.

Example 2

Gas Separation Using MCBBs

Low pressure gas adsorption measurements were performed using a custom-built stainless steel gas sorption apparatus specifically designed for small (100-200 mg) samples; containing a PX303-015A5V pressure transducer from Omega Engineering Corporation, a 47 mm membrane holder catalogue number XX4404700 from Millipore Corporation, and Swagelok tube fittings and valves. The data was acquired by a ADAC DaqBoard Pci5500MF from Abu Dhabi Airports Company and processed with Labview 7 Express from National Instruments. All samples were placed under vacuum between tests to remove all adsorbed gases, and kept at 20° C. for both adsorption testing and off-gassing phases. $CO_2$ and $N_2$ were used unaltered from Airgas, Inc. in single gas experiments for ideal gas adsorption, no mixed gas studies were performed.

Figure 5:
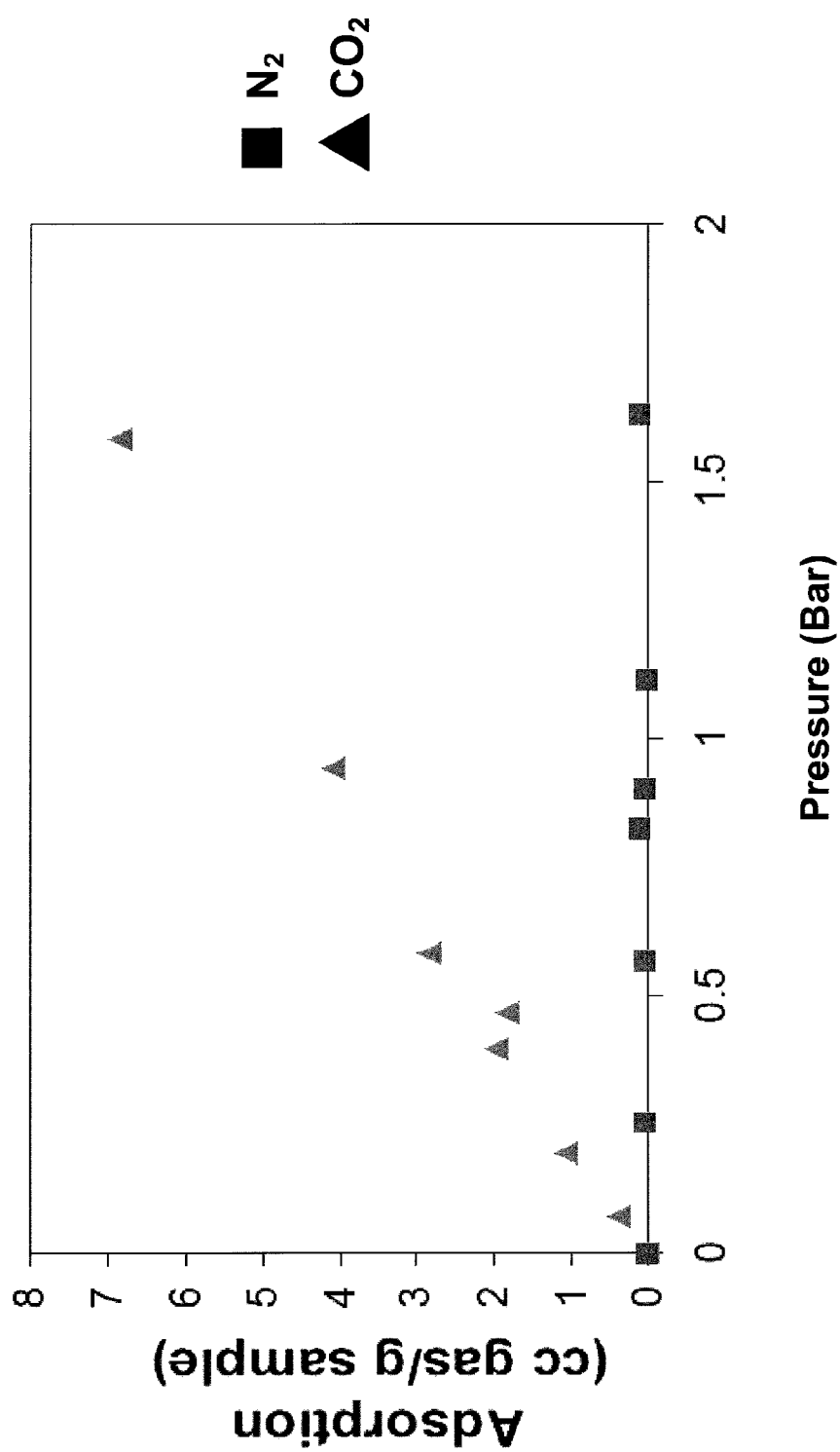
FIG. 5 is a graph of an adsorption isotherm of $CO_2$ and $N_2$ at 20° C. for a molecular cage building block.

The following example demonstrates the achievement of $CO_2/N_2$ adsorption selectivity utilizing MCBBs. To demonstrate the potential of compound 410 in $CO_2/N_2$ separation, the adsorption capacity of $CO_2$ and $N_2$ were measured, as shown in FIG. 5. Compound 410, in a powder form, showed a minimum ideal $CO_2/N_2$ adsorption selectivity of 100 at 1 bar, as displayed in FIG. 5. The adsorption capacity of $CO_2$ at standard temperature and pressure (STP, 20° C., 1 bar) was 4.5±0.1 cc/g ($cm^3$ gas at STP per gram of compound 410), while nitrogen adsorption was below 0.045 cc/g, which is the minimum detection limit of the adsorption apparatus. The loading was demonstrated to be completely reversible by applying vacuum to the sample at room temperature and repeating the adsorption test to achieve the same loading capacity.

Example 3

Preparation of Polymer-Ceramic Composite Bulk Material Using MCBBs

Figure 6:
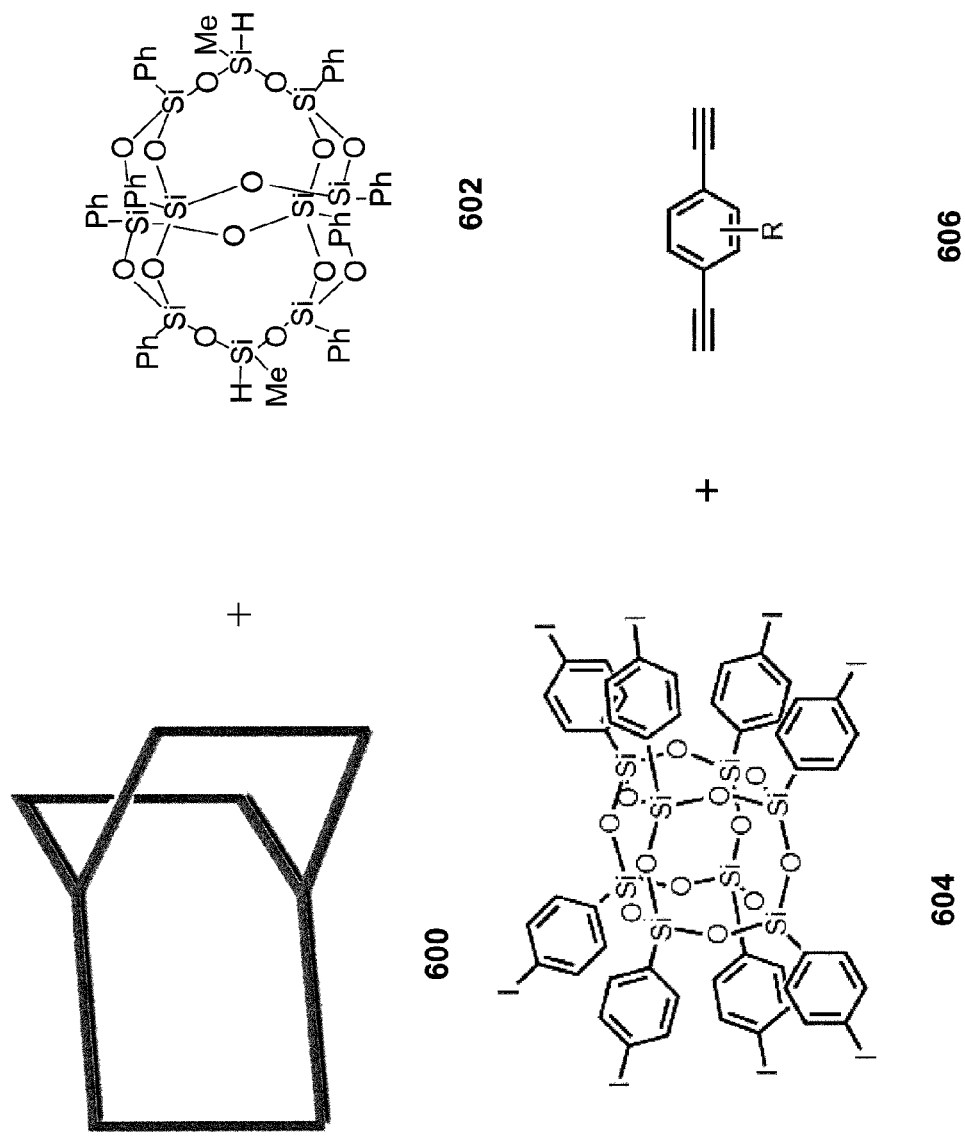
FIG. 6 illustrates formation of polymer-ceramic composite bulk material.

The following example demonstrates the potential preparation of bulk material structures comprising MCBB-ceramic composites. As shown in FIG. 6, MCBB 600 is reacted with a silicon-oxide-based linker molecule 602 that contains reactive sites with silicon-hydrogen bonds to ultimately produce a composite bulk material. In one embodiment, an alkene bond of the MCBB reacts with a Si—H bond of 602 through an additional reaction. Additionally, a silicon-oxide-based cage block 604 is reacted with an organic linker 606 that contains a desired functional group linker R to produce a composite material.

Example 4

Preparation of Polymer-Metal Nanoparticle Composite Bulk Material Using MCBBs

Figure 7:
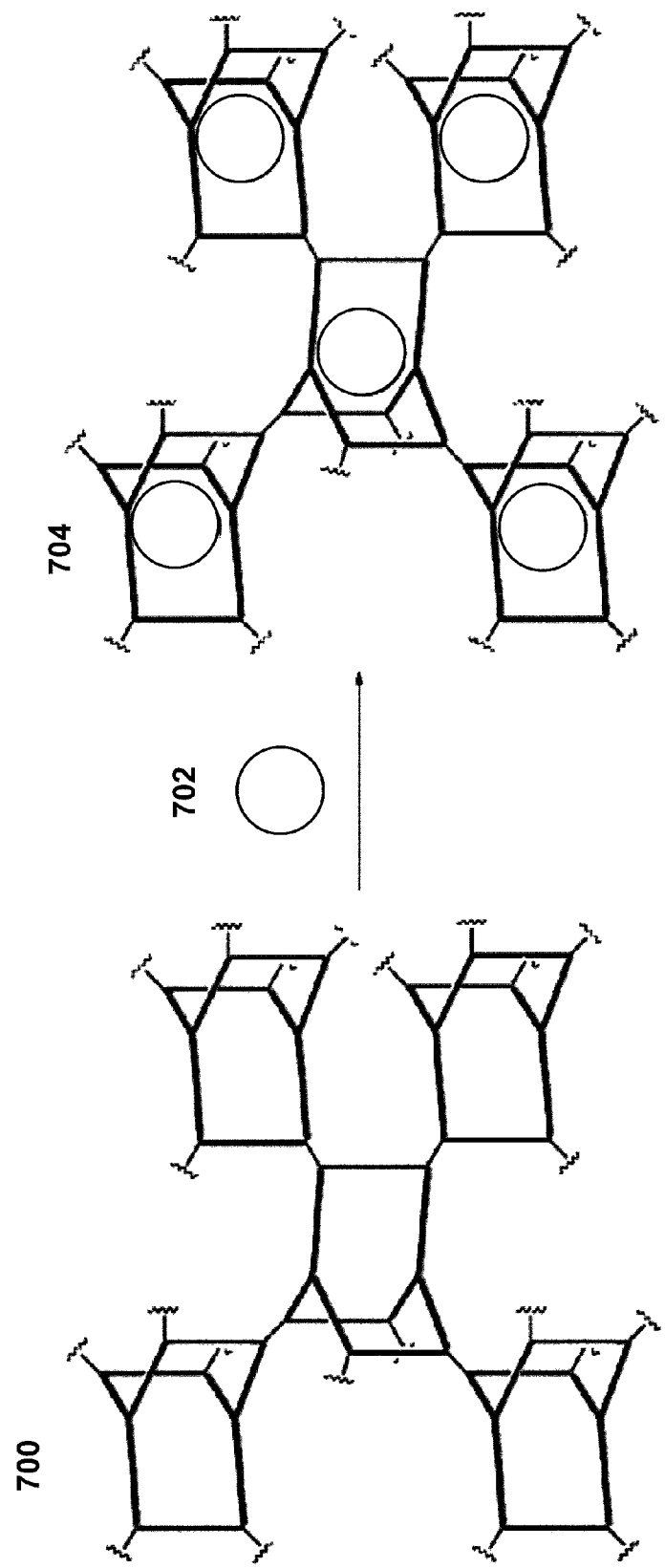
FIG. 7 illustrates formation of polymer-nanoparticle composite bulk material.

The following example demonstrates the potential preparation of bulk material structures 704 comprising MCBB-nanoparticle composites. As presented in FIG. 7, nanoparticles 702 are included during the formation of cross-linked MCBBs 700. After the formation of the MCBB 704 containing the nanoparticle 702, a cross-linking reaction between bromine containing functional groups with 1,4-diethynylbenzene optionally produces polymer-metal nanoparticle composite bulk material 704.

Example 5

MCBBs for Sensing Applications

Figure 8:
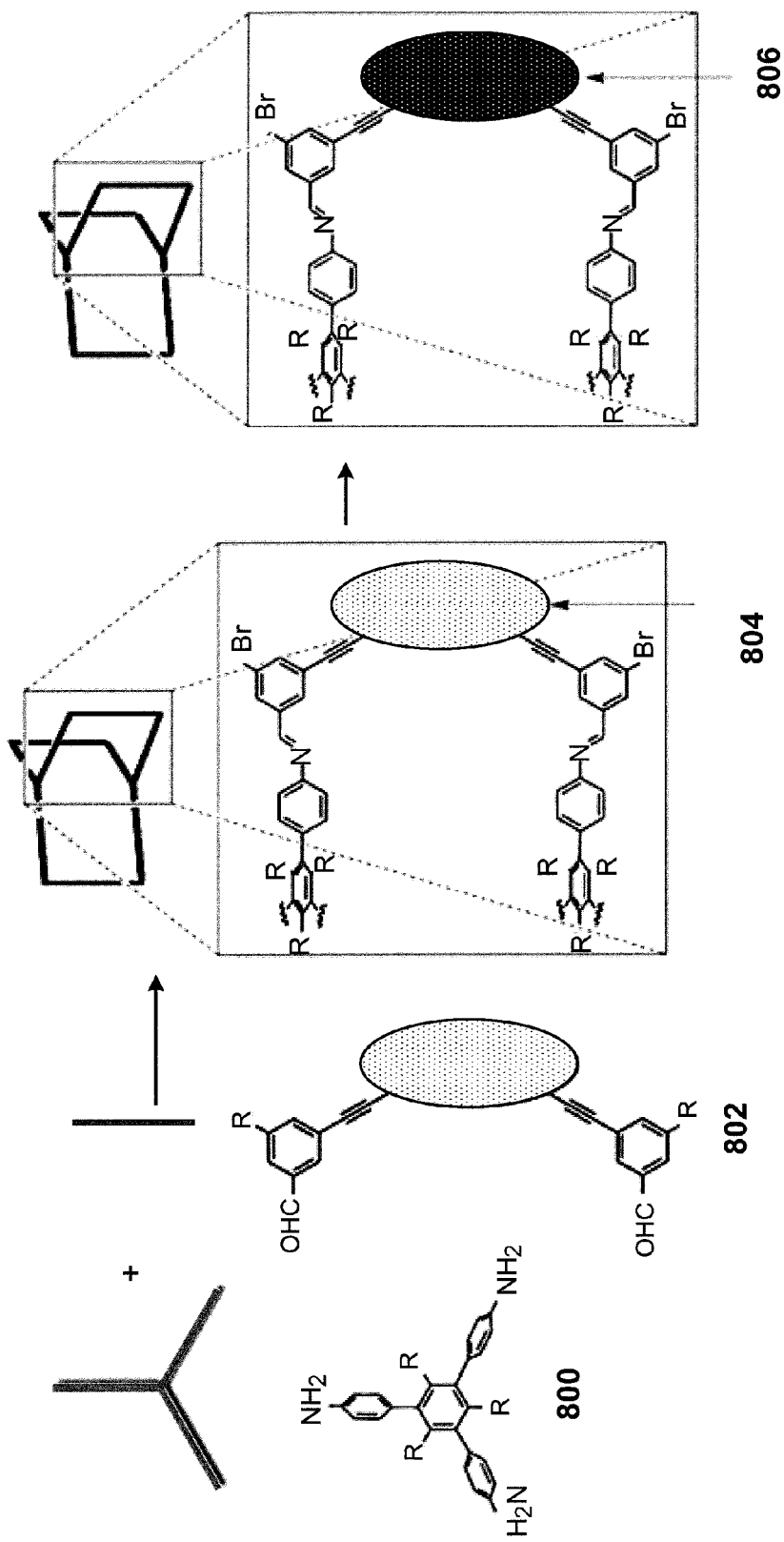
FIG. 8 illustrates production of solid-state sensors containing a fluorescence-based sensing moiety for explosive detection.

The following demonstrates potential sensing applications utilizing MCBBs. FIG. 8 illustrates the formation of MCBBs that could be cross linked to form porous bulk materials for chemical sensing. As shown in FIG. 8, MCBB formation proceeds by reacting a tri-functional material 800 (each of the three functional groups containing a primary amine) with a bi-functional material 802 (each of the two functional groups containing an aldehyde) in a 2:3 stoichiometric ratio, respectively. Additionally, the bi-functional material contains a sensing moiety 804. Exposure of the MCBB to an explosive analyte triggers generation of fluorescence 806.

FIG. 8 also illustrates field-portable, solid state sensors containing organic porous bulk materials for the detection of an explosive analyte. In particular, the MCBBs contain chemical moieties 804 capable of sensing an explosive analyte. In one example, a redox-active molecule 804 is used as a MCBB chemical moiety for sensing an explosive analyte.

Changes may be made in the above compositions, methods, and systems without departing from the scope hereof. It should be noted that the matter contained in the above description or shown in the accompanying drawings should be interpreted as illustrative and not in a limiting sense. The following claims are intended to cover all generic and specific features described herein, as well as all statements of the scope of the present method and system and reasonable variations thereof, which, as a matter of language, might be said to fall therebetween.

What is claimed is:

1. A molecular cage building block selected from the group consisting of 1, 2, 3, 4, 17 and cage I

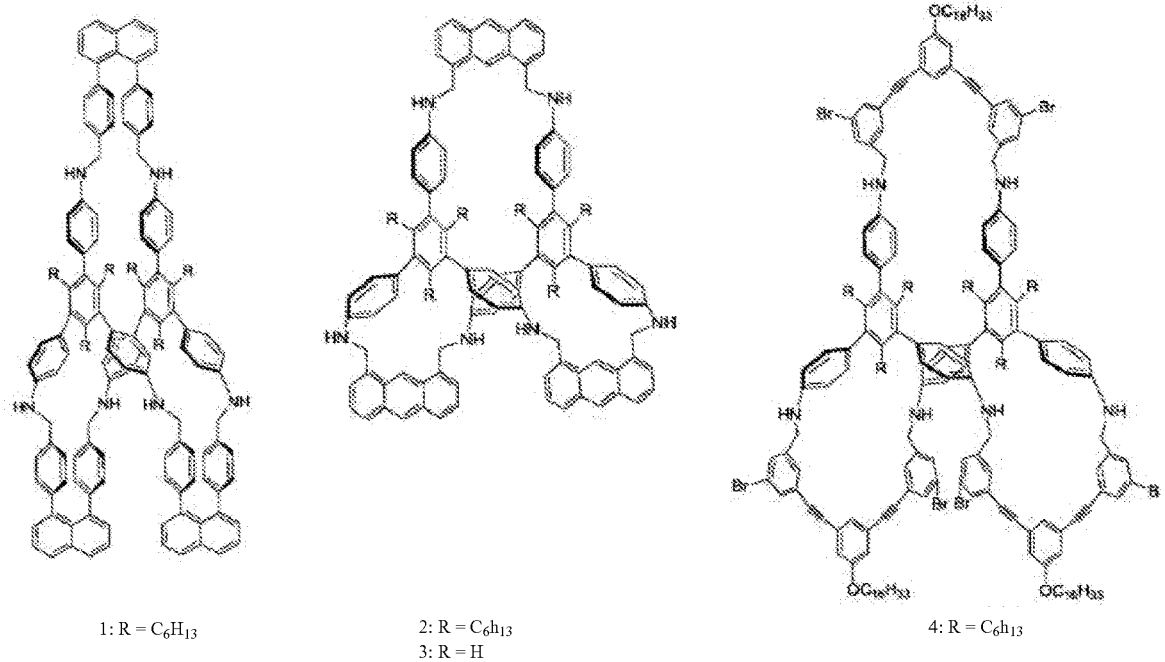

1: R = C$_6$H$_{13}$

2: R = C$_6$h$_{13}$
3: R = H

4: R = C$_6$h$_{13}$

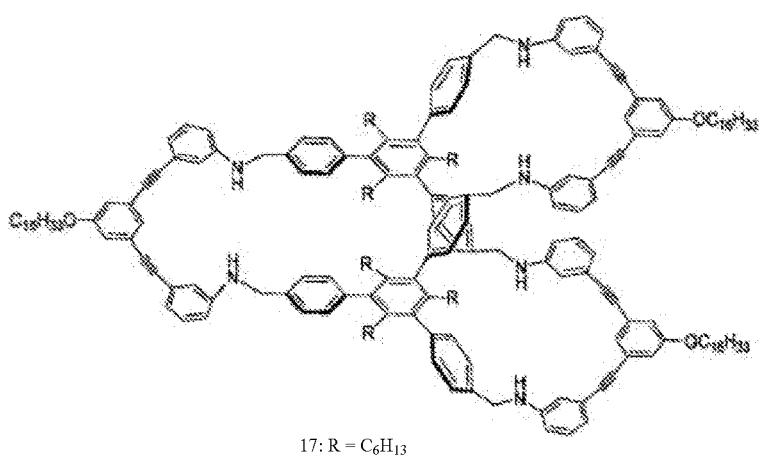

17: R = C$_6$H$_{13}$

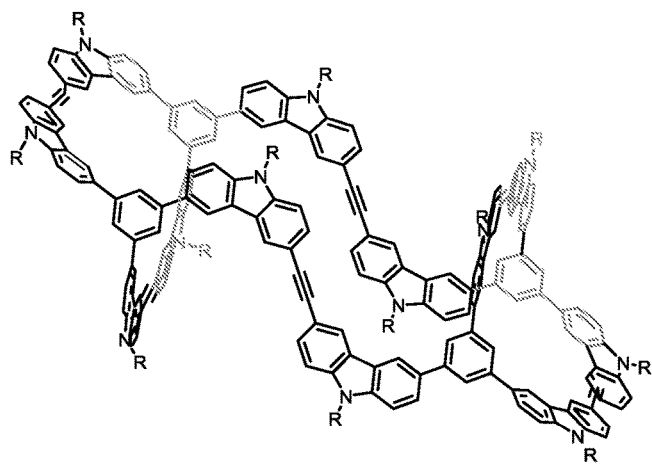
Cage I.
2. A method of performing gas separation, the method comprising exposing a molecular cage building block to a mixture of gaseous molecules, whereby the gaseous molecules are separated, wherein the molecular cage building block selected from the group consisting of 1, 2, 3, 4, 17 and cage I
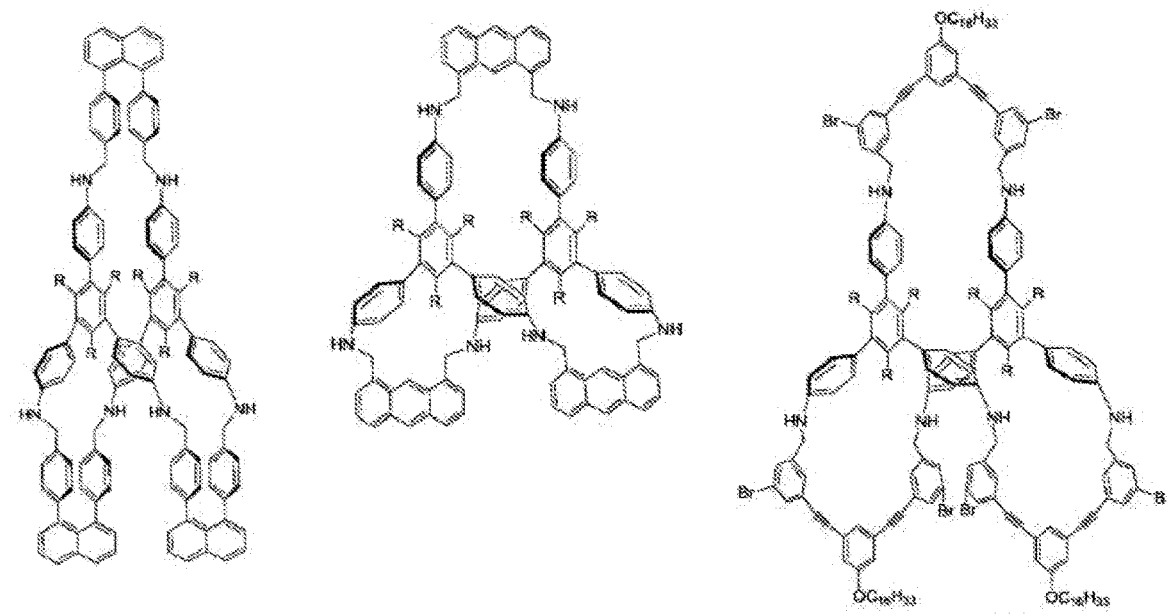
1: R = $C_6H_{13}$    2: R = $C_6H_{13}$    4: R = $C_6H_{13}$
3: R = H -continued

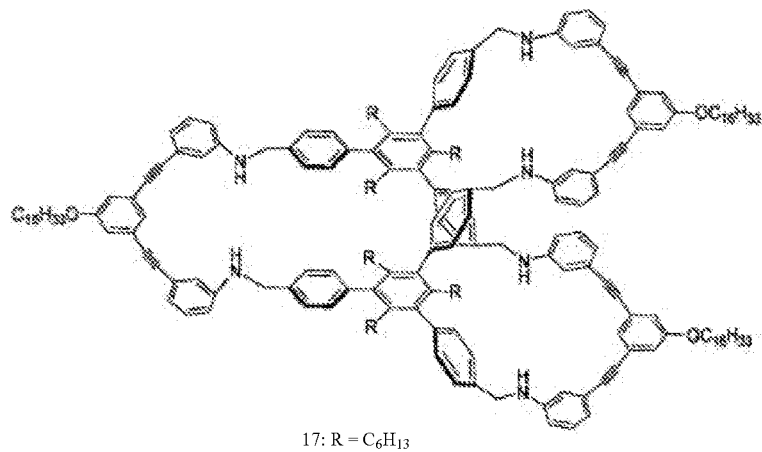

17: R = C₆H₁₃

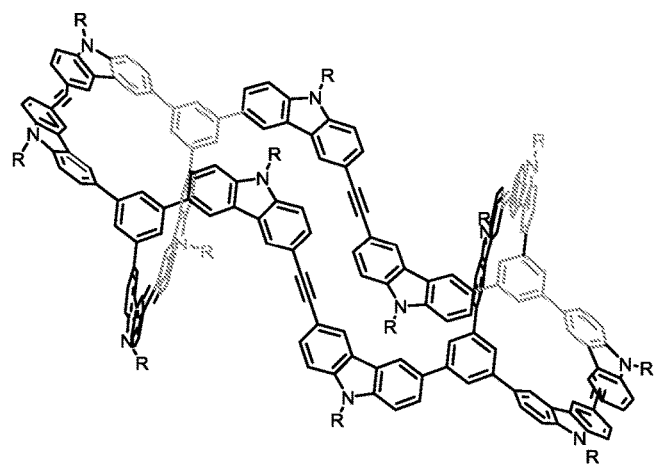

Cage I.

3. The method of claim 2, wherein the molecular cage building block separates $CO_2$ from $N_2$.

4. A method of preparing a molecular cage building block, the method comprising:
   combining at least two polyamine molecules with at least two dialdehyde molecules in a one-pot reaction to yield a molecular cage building block having a non-collapsible structure,
   optionally further comprising performing a hydride reduction reaction to reduce carbon-nitrogen double bonds in the molecular cage building block to carbon-nitrogen single bonds, wherein the molecular cage building block is selected from the group consisting of 1, 2, 3, 4, 17 and cage I

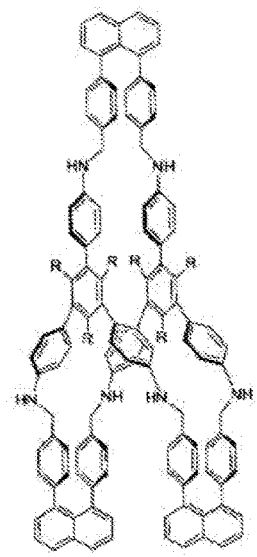
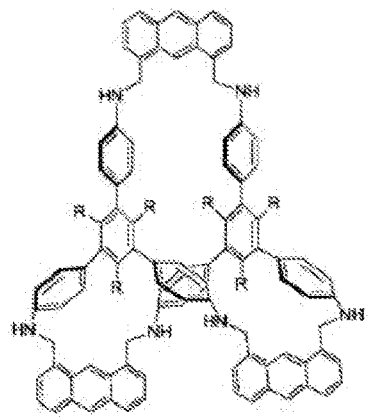
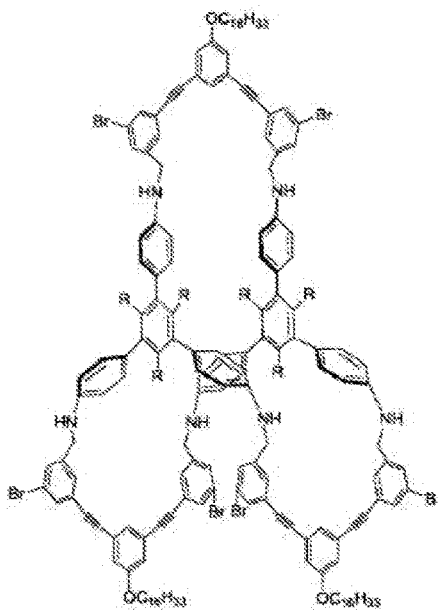
1: R = C₆H₁₃     2: R = C₆h₁₃     4: R = C₆h₁₃
                   3: R = H
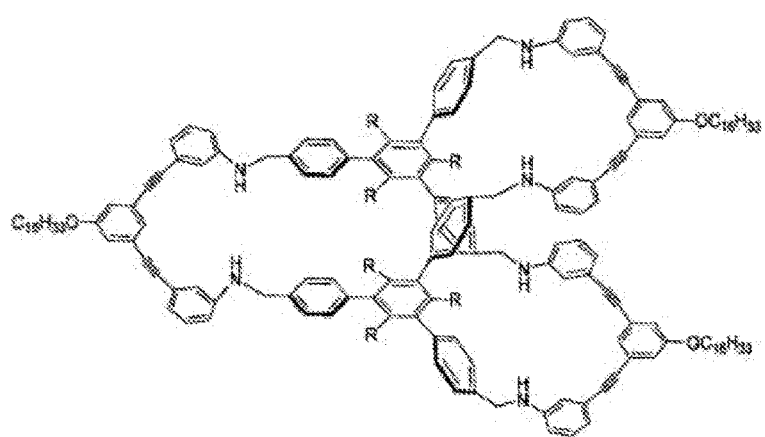
17: R = C₆H₁₃
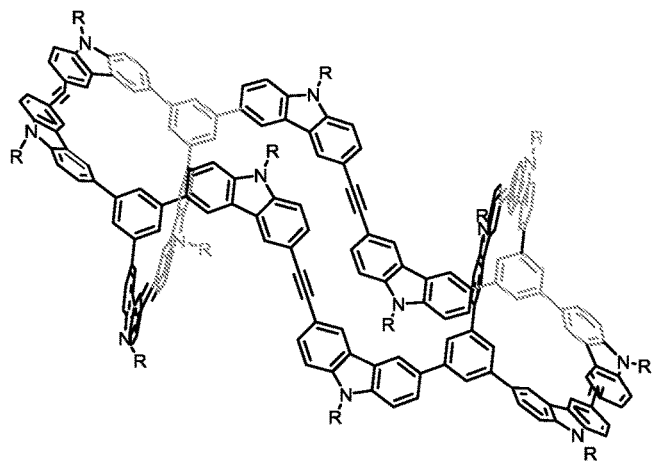
Cage I.
\* \* \* \* \*